United States Patent
Fukuzawa

(10) Patent No.: US 7,444,031 B2
(45) Date of Patent: Oct. 28, 2008

(54) IMAGE PROCESSING APPARATUS

(75) Inventor: Keiichi Fukuzawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/970,213

(22) Filed: Jan. 7, 2008

(65) Prior Publication Data

US 2008/0123971 A1    May 29, 2008

Related U.S. Application Data

(62) Division of application No. 10/731,124, filed on Dec. 10, 2003, now Pat. No. 7,373,006.

(30) Foreign Application Priority Data

Dec. 12, 2002   (JP)  ............................. 2002-361356

(51) Int. Cl.
    *G06K 9/36* (2006.01)
(52) U.S. Cl. ...................................... 382/240; 382/232
(58) Field of Classification Search .................. 382/240, 382/132, 212, 232, 233, 239, 248–249, 263, 382/264, 276; 375/275, 303, 324, 344, 347, 375/40, 240.01–240.02, 240.08–240.12, 375/240.18–240.192; 348/400.1; 370/344, 370/479

See application file for complete search history.

(56) References Cited

U.S. PATENT DOCUMENTS

| 5,835,529 | A  | * | 11/1998 | Koga et al. .................. 375/131 |
| 6,792,156 | B2 | * | 9/2004  | Lee ........................... 382/249 |
| 2005/0286780 | A1 | * | 12/2005 | Takahashi et al. ........... 382/232 |

FOREIGN PATENT DOCUMENTS

JP           11-313338       11/1999

* cited by examiner

*Primary Examiner*—Samir A Ahmed
*Assistant Examiner*—Mehdi Rashidian
(74) *Attorney, Agent, or Firm*—Fitzpatrick, Cella, Harper & Scinto

(57) ABSTRACT

An image processing apparatus, which reduces occurrence of color-unevenness and a color shift under low illuminance and high illuminance, includes a data processing means for obtaining image data, converts the image data into frequency data in a frequency band, and performs certain processing on the frequency data, an illuminance detection means for detecting illuminance of the obtained image data, and a changing means for changing the predetermined data processing on certain frequency data in accordance with a result of the illuminance detection.

10 Claims, 24 Drawing Sheets

IMAGE PROCESSING APPARATUS

RELATED APPLICATION

This application is a divisional of application Ser. No. 10/731,124, filed Dec. 10, 2003, the entire contents of which are incorporated herein by reference.

BACKGROUND OF THE INVENTION

1. Field of the Invention

The present invention relates to an image processing apparatus that compression-encodes image data through conversion into frequency bands or an image processing apparatus that expansion-decodes image data having been compression-encoded through conversion into frequency bands.

2. Related Background Art

Recent digital video cameras and digital still cameras use image pickup elements having high sensitivities and are capable of setting a maximum gain of automatic gain control (AGC) to be extremely high at the time of digital conversion.

In such a system, even when the color temperature of an object deviates slightly from a preset color temperature of an image pickup element, there is a large fear in that lost of color balance may conspicuously appear depending on the magnitude of a gain set with reference to illuminance of the object. As a result, at the time of low illuminance, unnatural coloring occurs in an image due to a noise component. Conversely, at the time of high illuminance, there occurs a phenomenon in which a part of an image that is originally white has a tinge of blue or a tinge of red. In view of this problem, a conventional camera performs color suppression processing for a chrominance signal processing system, thereby avoiding an unnatural coloring phenomenon.

In a camera processing circuit of such a camera, generally, a non-linear chrominance signal processing apparatus performs color suppression processing on chrominance data in accordance with illuminance, and resultant chrominance data is corrected so as to be suited for display characteristics through gamma correction and the like. On the other hand, luminance data is subjected to correction corresponding to the color suppression processing performed on the chrominance data.

Now, a schematic construction of a conventional digital video camera will be described with reference to FIG. 15 (digital still camera also has the illustrated construction). Also, a schematic construction of a non-linear chrominance processing circuit 340 of the digital video camera will be described with reference to FIG. 16.

In FIG. 15, an electric signal obtained by picking up an image of an object with a lens and image pickup system 300 is inputted into a camera processing circuit 310. In the camera processing circuit 310, the electric signal is converted into a digital signal by an A/D conversion circuit 320 and the digital signal is divided into components that are luminance data (Y) and chrominance data (C) by a component conversion circuit 330. Following this, the luminance data and the chrominance data are processed in a non-linear color processing circuit 340 to be described in detail later, and are corrected in a correction circuit 350. Then, an output from the camera processing circuit 310 is compression-encoded by a compression encoding circuit 360 and is recorded on a recording medium 370.

Next, a construction of the non-linear chrominance processing circuit 340 will be described with reference to FIG. 16. When an image signal is inputted into the non-liner color processing circuit 340, first, a low-pass filter 341 extracts a low-frequency component from luminance data of the input image signal. Then, an illuminance detection unit 342 detects illuminance of an image from the extracted low-frequency component.

Here, the luminance data contains data showing each part (bright part, for instance) of an image, in which brightness greatly changes, and data showing the overall brightness of the image. The former data is contained mote largely in a high-frequency component and the latter data is contained more largely in the low-frequency component. Accordingly, the illuminance of the image can be detected by extracting the low-frequency component of the luminance data and comparing the extracted component with a predetermined value.

Here, FIGS. 17A, 17B, and 17C each schematically show a frequency distribution of luminance data, with FIG. 17B relating to a normal image, FIG. 17A relating to a high-illuminance image, and FIG. 17C relating to a low-illuminance image. As can be seen from these drawings, generally, even if illuminance is lowered, data in a high-frequency region (region in which brightness and darkness greatly change) does not so greatly change as compared with data in a low-frequency region, which means that detection of illuminance using low-frequency data (a hatched region in the drawings) is effective.

Next, referring again to FIG. 16, an operation in the case of a low-illuminance image having the frequency distribution shown in FIG. 17C will be described. When the low-frequency component of the luminance data is smaller than the predetermined value, the illuminance detection unit 342 detects that the image is at low illuminance and controls a chrominance data gain correction unit 343 so as to reduce a gain, thereby reducing the influence of a chrominance component in a region, where the illuminance is equal to or lower than the predetermined value, as shown in FIG. 18. As a result of this processing, the chrominance data is limited to a specific color (usually to achromatic color). Then, a correction signal generation unit 344 generates a correction signal of the luminance data for realizing a color balance with which the specific color becomes the achromatic color, and outputs the correction signal.

Originally, a high gain is set by the AGC for the low-illuminance image and therefore the noise component is amplified. If the noise component is contained in the chrominance data, this results in a situation where there occurs unnatural color-unevenness that is not originally possessed by the object. By performing the non-linear processing in the manner described above, however, in the case of illuminance equal to or lower than the predetermined value, a chrominance level is uniformly limited (suppressed), so that such unnatural color-unevenness does not occur and an image only having brightness and darkness indicated by the luminance data is obtained. As a result, image data that is visually favorable is obtained.

Next, an operation in the case of a high-illuminance image having the frequency distribution shown in FIG. 17A will be described with reference to FIG. 16. When the low-frequency component of the luminance data is larger than the predetermined value, the illuminance detection unit 342 detects that the image is at high illuminance and controls the chrominance data gain correction unit 343 so as to reduce the gain, thereby reducing the influence of the chrominance component in a region, where the illuminance is equal to or higher than the predetermined value, as shown in FIG. 18. As a result of this processing, the chrominance data is limited to a specific color (usually to white). Then, the correction signal generation unit 344 generates a correction signal of the luminance data for realizing a color balance with which the specific color becomes white, and outputs the correction signal.

Originally, a low gain is set by the AGC for the high-illuminance image and then the level of the chrominance data is large in this case. Therefore, a slight error in white balance due to a change in color temperature is emphasized, which results in a situation where the image has a tinge of blue or a tinge of red and a strange color drift occurs. By performing the non-linear processing in the manner described above, however, in the case of illuminance equal to or higher than the predetermined value, the chrominance level is uniformly limited (suppressed), so that no unnatural coloring occurs and an image only having brightness and darkness indicated by the luminance data is obtained. As a result, image data that is visually favorable is obtained.

However, the color-unevenness at the time of low illuminance is a problem that occurs due to an increase of the high-frequency noise component with respect to the low-frequency signal level. In order to solve this problem, with the construction described above, fluctuations due to the high-frequency noise component are cancelled out by uniformly limiting signal levels in all frequency bands. This leads to a situation where an object that originally is colored even under low illuminance is also subjected to the image correction to the achromatic color.

Also, there is a problem that the picked-up color at the time of high illuminance appears so that a slight color drift exerts an excessive influence since the absolute value of the low-frequency signal level is large. In order to solve this problem, with the construction described above, the low-frequency signal level is suppressed by uniformly limiting the signal levels in all frequency bands. This leads to a situation where an object that originally includes color changing even under high illuminance is also subjected to the image correction to white.

That is, with the conventional method, information originally possessed by an object is unnecessarily deleted as a result of visual effect processing.

SUMMARY OF THE INVENTION

An object of the present invention is to solve the above-described problems.

Another object of the invention is to provide an image processing apparatus that changes an image processing operation, in particular, image data compression encoding processing or decoding expansion processing in accordance with illuminance.

As to such objects, according to an aspect of the present invention, an image processing apparatus comprises:

an input means for inputting image data;

a frequency conversion means for converting the image data into frequency data in a frequency band;

a data processing means for performing predetermined processing on the frequency data generated by the frequency conversion means;

an illuminance detection means for detecting illuminance of the image data; and a changing means for changing operation of the data processing means on predetermined frequency data in accordance with an output of the illuminance detection means.

According to another aspect of the present invention, an image processing apparatus for decoding encoded image data, comprises:

an input means for inputting the encoded image data;

a data processing means for performing predetermined processing on the encoded image data;

an illuminance detection means for detecting illuminance of the encoded image data; and a changing means for changing operation of the data processing means on predetermined frequency data of the encoded image data in accordance with an output of the illuminance detection means.

Still other objects of the present invention, and the advantages thereof, will become fully apparent from the following detailed description of the embodiments.

DESCRIPTION OF THE PREFERRED EMBODIMENTS

The preferred embodiments of the present invention will now be described in detail hereinafter with reference to the accompanying drawings.

First Embodiment

Figure 1:
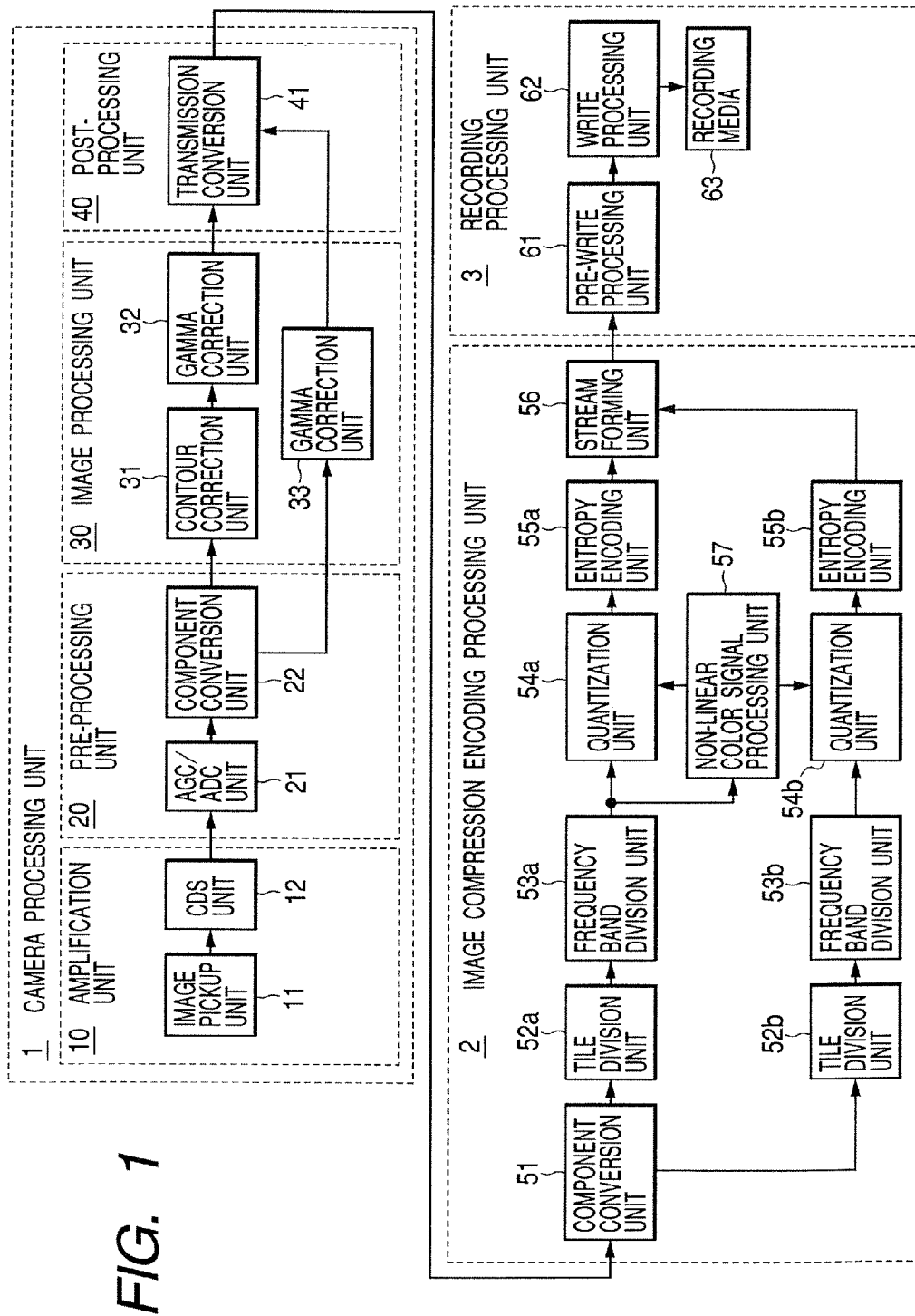
FIG. 1 is a block diagram of a recording system of a video camera that is a first embodiment of the present invention.

FIG. 1 is a block diagram of a recording system of a camera-integrated video recording and reproduction apparatus (hereinafter referred to as the "video camera") that is a first embodiment of the present invention.

Referring to FIG. 1, the video camera mainly includes a camera processing unit 1, an image compression encoding processing unit 2, and a recording processing unit 3, with the camera processing unit 1 including an amplification unit 10, a pre-processing unit 20, an image processing unit 30, and a post-processing unit 40.

A concrete construction of the recording system of the video camera and an operation thereof will be described below.

In the amplification unit 10 of the camera processing unit 1, an image of an object is condensed by a not-shown lens optical system and is converted into an electric signal by an image pickup unit 11. Then, the electric signal is outputted from the image pickup unit 11 to a correlated double sampling (CDS) unit 12, in which in-phase noise, such as amp noise and reset noise of an image pickup element, is removed from the electric signal, and the resultant electric signal is amplified.

Following this operation, in the pre-processing unit 20, the amplified electric signal is inputted as an image signal into an AGC/ADC unit 21, in which the signal is subjected to AGC so as to have a predetermined signal level and then is converted into digital data by an analog-digital converter (ADC). Here, the AGC is controlled based on a not-shown signal that mainly indicates the brightness of the image. That is, when the illuminance of the captured object image is low, a high gain is set with which the signal assumes a predetermined magnitude. On the other hand, when the illuminance is high, a small gain is set. This operation enables utilization of the dynamic range of AD conversion. Then, a component conversion unit 22 separates the image data from the AGC/ADC unit 21 into luminance data and chrominance data.

Subsequently, in the image processing unit 30, a contour correction unit 31 performs contour enhancement processing on the luminance data so that the luminance data becomes suited for displaying, and a gamma correction unit 32 performs non-linear inverse correction on resultant luminance data. On the other hand, a gamma correction unit 33 performs non-linear inverse correction on the chrominance data so that the chrominance data becomes suited for displaying.

The image data having been subjected to the image processing described above is sent to a transmission conversion unit 41 in the post-processing unit 40, in which the luminance data and the chrominance data of the image data are multiplexed into each other, and the resultant data is sent to the image compression encoding processing unit 2.

In this embodiment, the image compression encoding processing unit 2 adopts a compression system using frequency band division conversion. The following description will be made by assuming that JPEG 2000 (including Motion JPEG 2000) is used as an example of the compression system using the frequency band division conversion.

Figure 19:
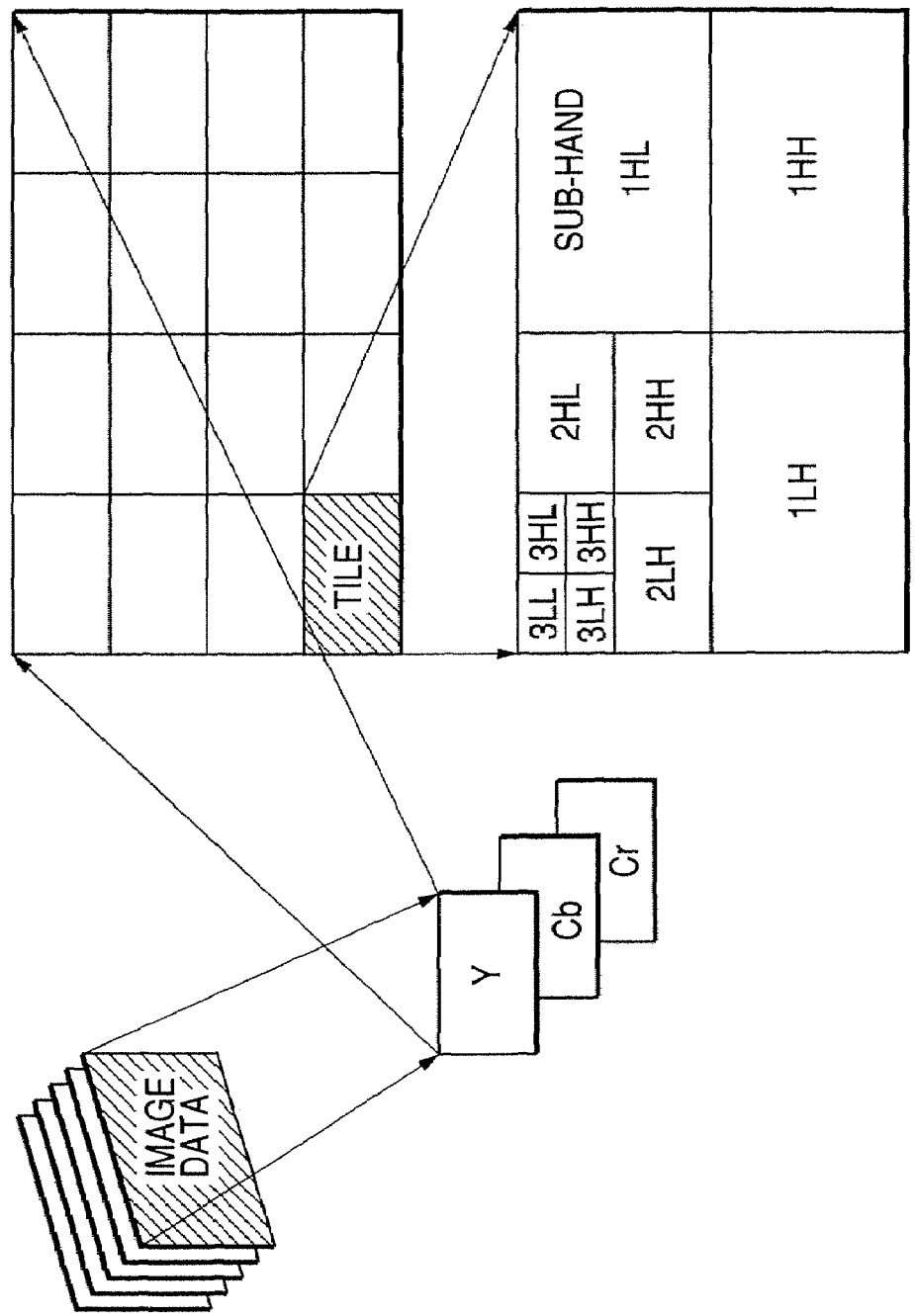
FIG. 19 is a conceptual diagram of image data processing performed during encoding processing.

In the image compression encoding processing unit 2, on receiving the image data sent from the camera processing unit 1, a component conversion unit 51 converts the image data into components (Y, Cb, Cr) for image compression processing. Then, among these components, the luminance component (Y) of one frame image is divided by a tile division unit 52a into small areas (tiles) having a predetermined size. A frequency band division unit 53a divides each tile of the image data into frequency band components (sub-bands). These operations are illustrated as shown in FIG. 19. Note that under JPEG 2000, the frequency band division unit 53a performs discrete wavelet conversion by which frequency band division into a high-frequency band and a low-frequency band is performed concurrently with down sampling. The same processing is repeatedly performed on low-frequency data in a recursive manner, so that a structure shown in FIG. 19 is obtained which includes multiple sub-bands from low-frequency data (3LL) to high-frequency data (1HH).

Next, the discrete wavelet conversion performed by the frequency band division unit 53a will be described in detail with reference to FIG. 20.

Figure 20:
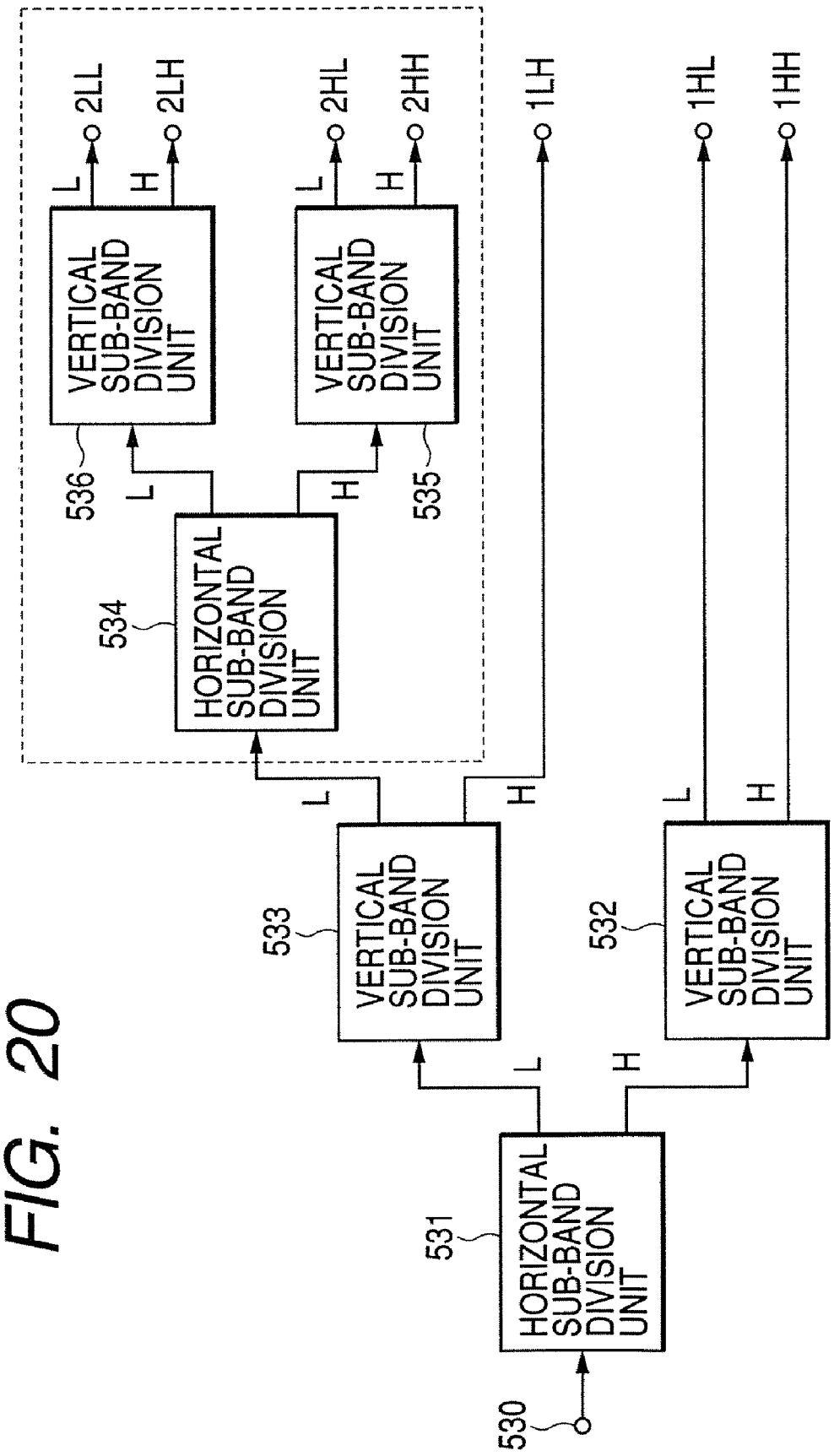
FIG. 20 is a conceptual diagram of sub-band division performed during the encoding processing.
Figure 21A:
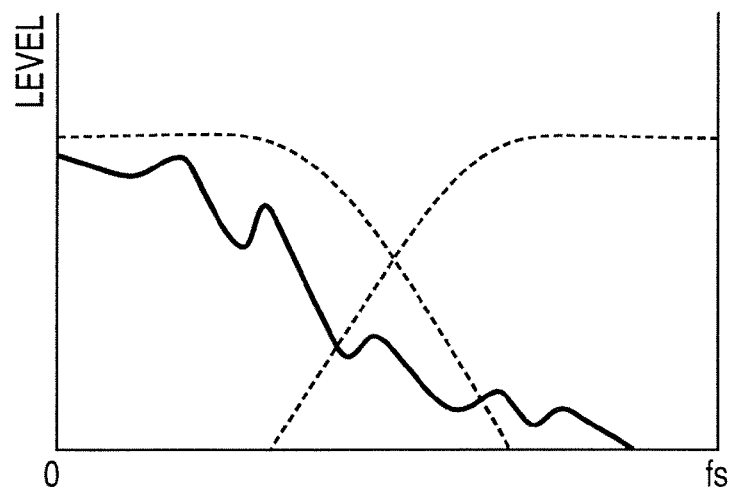
FIGS. 21A, 21B, and 21C are each a conceptual diagram of analysis filters used during the encoding processing.
Figure 21B:
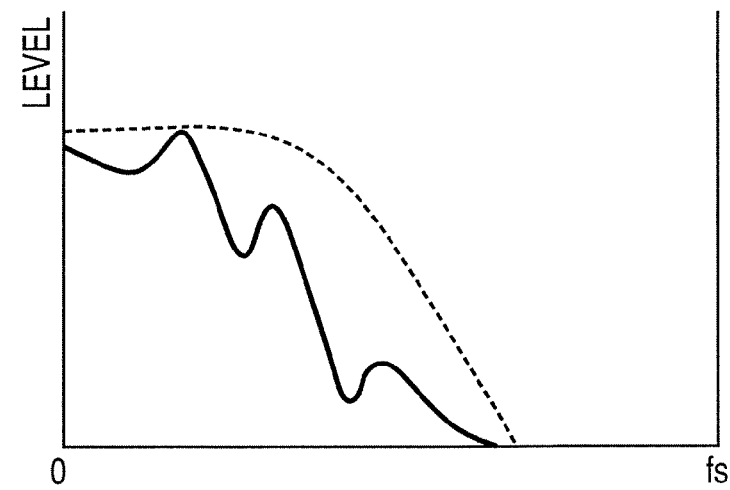
Figure 21C:
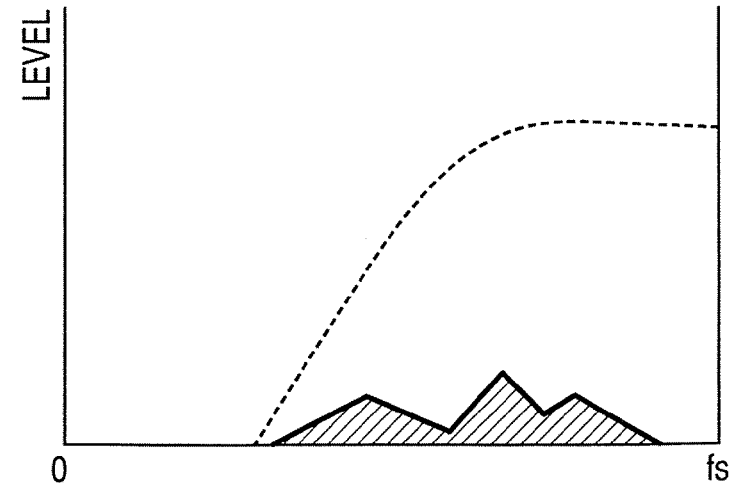

In FIG. 20, when image data of a tile is inputted through an input terminal 530, first, a horizontal sub-band division unit 531 performs filter division on the image data in a horizontal pixel direction. FIGS. 21A to 21C each schematically show a state of the filter division. A frequency distribution of a horizontal-direction pixel is shown in FIG. 21A with a solid line. By multiplying a pixel having the illustrated distribution using a low-pass filter and a high-pass filter that are indicated with broken lines in the drawings, a low-frequency component (see FIG. 21B) and a high-frequency component (see FIG. 21C) are extracted. The wavelet conversion is realized by lifting operation which is capable of performing down-sampling processing concurrently with this extraction operation. As a result of the horizontal sub-band division by the horizontal sub-band division unit 531, the image data is divided into a low-frequency coefficient (L) and a high-frequency coefficient (H) in a horizontal direction. By further performing the same processing on the coefficient data in a vertical direction, the wavelet conversion processing for one hierarchical level is completed.

In FIG. 20, the high-frequency coefficient (H) in the horizontal direction generated by the horizontal sub-band division unit 531 is converted into a low-frequency coefficient (1HL) and a high-frequency coefficient (1HH) by a vertical sub-band division unit 532. On the other hand, the low-frequency component (L) in the horizontal direction generated by the horizontal sub-band division unit 531 is converted into a low-frequency coefficient (L) and a high-frequency coefficient (1LH) by a vertical sub-band division unit 533. Then, the low-frequency component (L) in the vertical direction generated by the vertical sub-band division unit 533 is divided into a low-frequency coefficient (L) and a high-frequency coefficient (H) in the horizontal direction by a horizontal sub-band division unit 534, with the low-frequency coefficient (L) being further divided into a low-frequency coefficient (2LL) and a high-frequency coefficient (2LH) in the vertical direction by a vertical sub-band division unit 536 and the high frequency coefficient (H) being further divided into a low-frequency coefficient (2HL) and a high-frequency coefficient (2HH) in the vertical direction by a vertical sub-band division unit 535. Although not shown in FIG. 20, the 2LL coefficient is further subjected to the wavelet conversion in the horizontal and vertical directions and coefficients 3HH, 3HL, 3LH, and 3LL are then obtained. As a result, coefficients shown in FIG. 19 are obtained.

Referring again to FIG. 1, the data (wavelet coefficients) converted by the frequency band division unit 53a is inputted into a quantization unit 54a and a non-linear color signal processing unit 57. The non-linear processing unit 57 is a feature of the present invention and controls image compression encoding processing, in particular, quantization processing by detecting illuminance. This non-linear processing unit 57 will be described in detail later.

Figure 22:
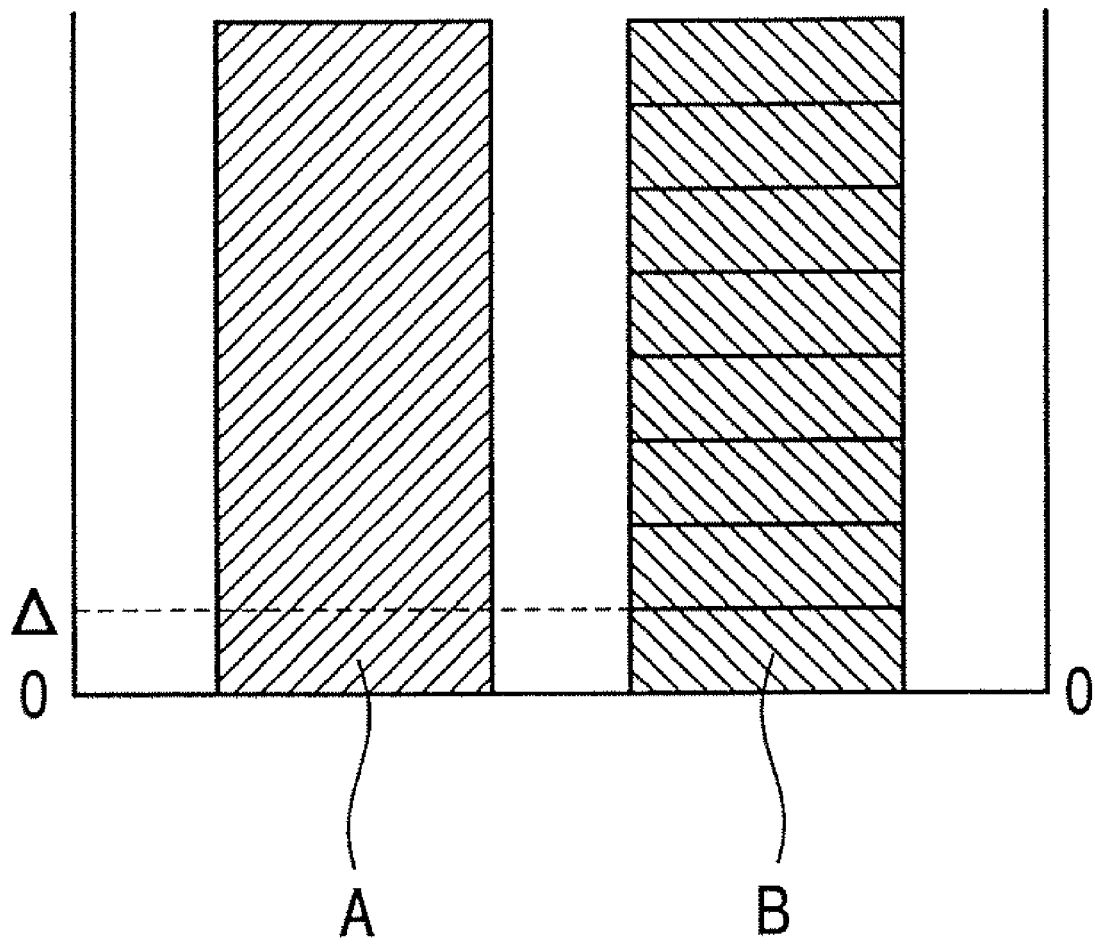
FIG. 22 is a conceptual diagram of quantization processing performed during the encoding processing.
Figure 23:
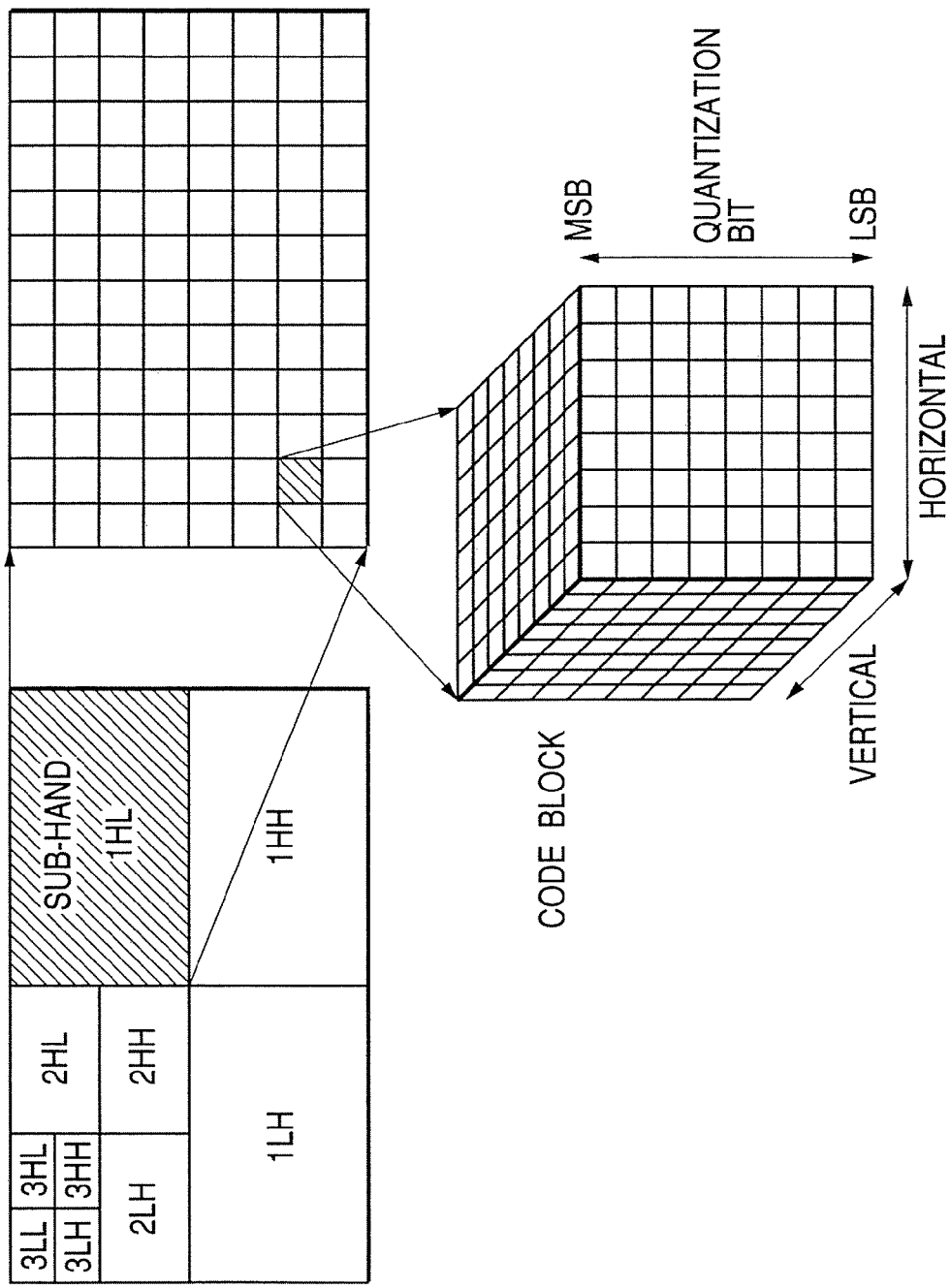
FIG. 23 is a conceptual diagram of entropy encoding unit performed during the encoding processing.

The quantization unit 54a quantizes the inputted data using a predetermined step size in accordance with an operation result of the non-linear color signal processing unit 57, and converts the quantized data into digital data having a predetermined bit length. As shown in FIG. 22, through coefficient quantization using a predetermined quantization step size Δ, a coefficient A is quantized and a quantization result (B) is obtained. Then, as shown in FIG. 23, an entropy encoding unit 55a processes data obtained as a result of the quantization of the sub-bands in a processing unit called "code block" in which a predetermined number of pixels (16×16 pixels, for instance) are collected. As will be described later, the entropy encoding unit 55a performs arithmetic encoding on each code block in units of bit planes, thereby realizing data compression.

Here, processing that is the same as the above-mentioned processing performed on the luminance component (Y) is performed on color difference components (Cr, Cb) by blocks 52b to 55b. The contents of this processing are the same as those described above and therefore will not be described again.

A stream forming unit 56 packs the data of each component compression-encoded in this manner into predetermined packets and rearranges the packets. Then, the stream forming unit 56 adds header information and the like to the packets, thereby forming a data stream. The generated data stream is sent to the recording processing unit 3.

In the recording processing unit 3, a pre-write processing unit 61 performs pre-processing for converting the data stream into a format suited for recording onto a recording medium 63 such as a tape, a disk, or a memory card. Then, a write processing unit 62 writes the data onto the recording medium 63.

The description of FIG. 1. has been made as stated above. Note that in FIG. 1, the luminance component is processed by the blocks 52a to 55a, and the color difference components are processed by the blocks 52b to 55b. However, these components may be actually processed by the same blocks.

Figure 24:
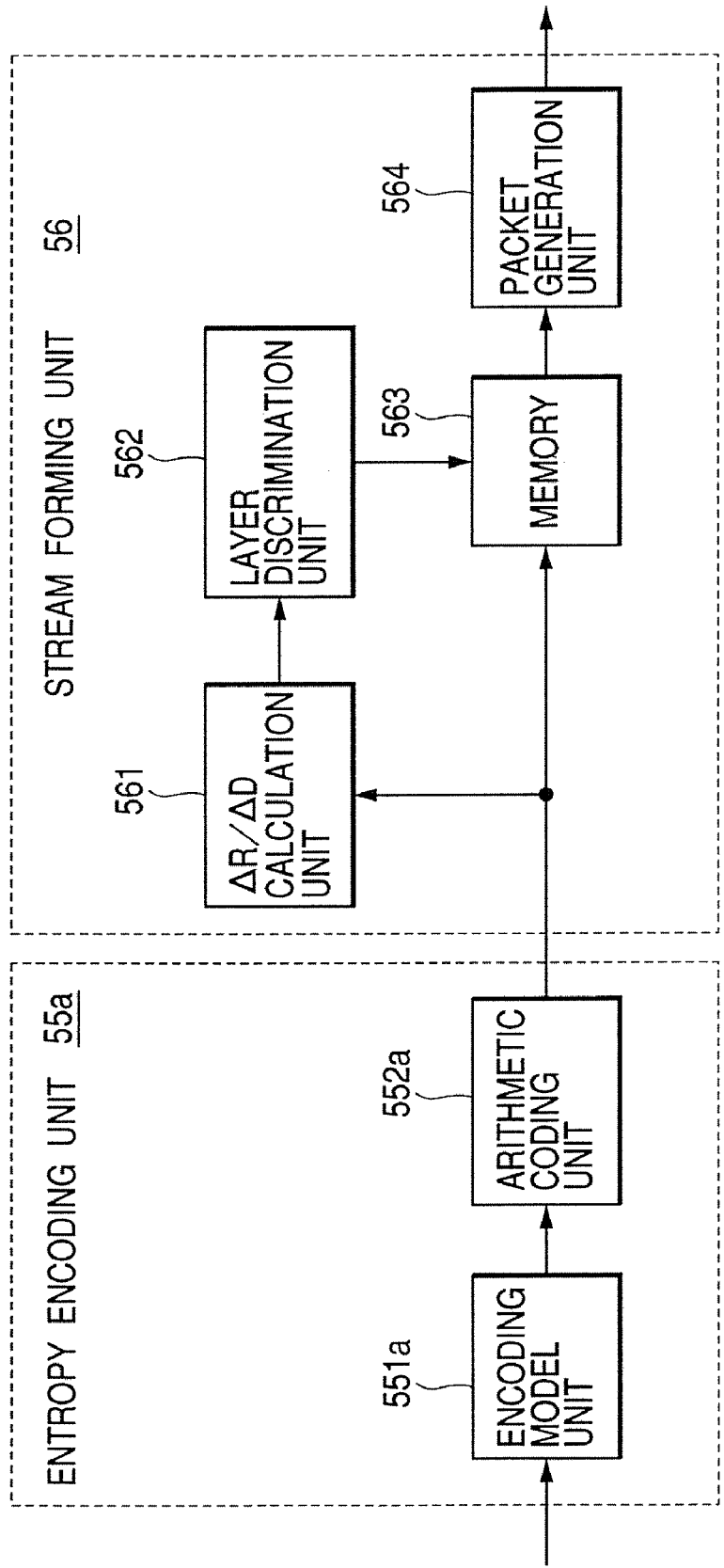
FIG. 24 is a conceptual diagram of entropy encoding processing and stream forming.

Next, operations of the entropy encoding units 55a and 55b and the stream forming unit 56 will be described in detail with reference to FIGS. 24 and 25. Note that in FIG. 24, for ease of explanation, only the entropy encoding unit 55a is illustrated as a representative because the entropy encoding units 55a and 55b have the same construction.

Figure 25:
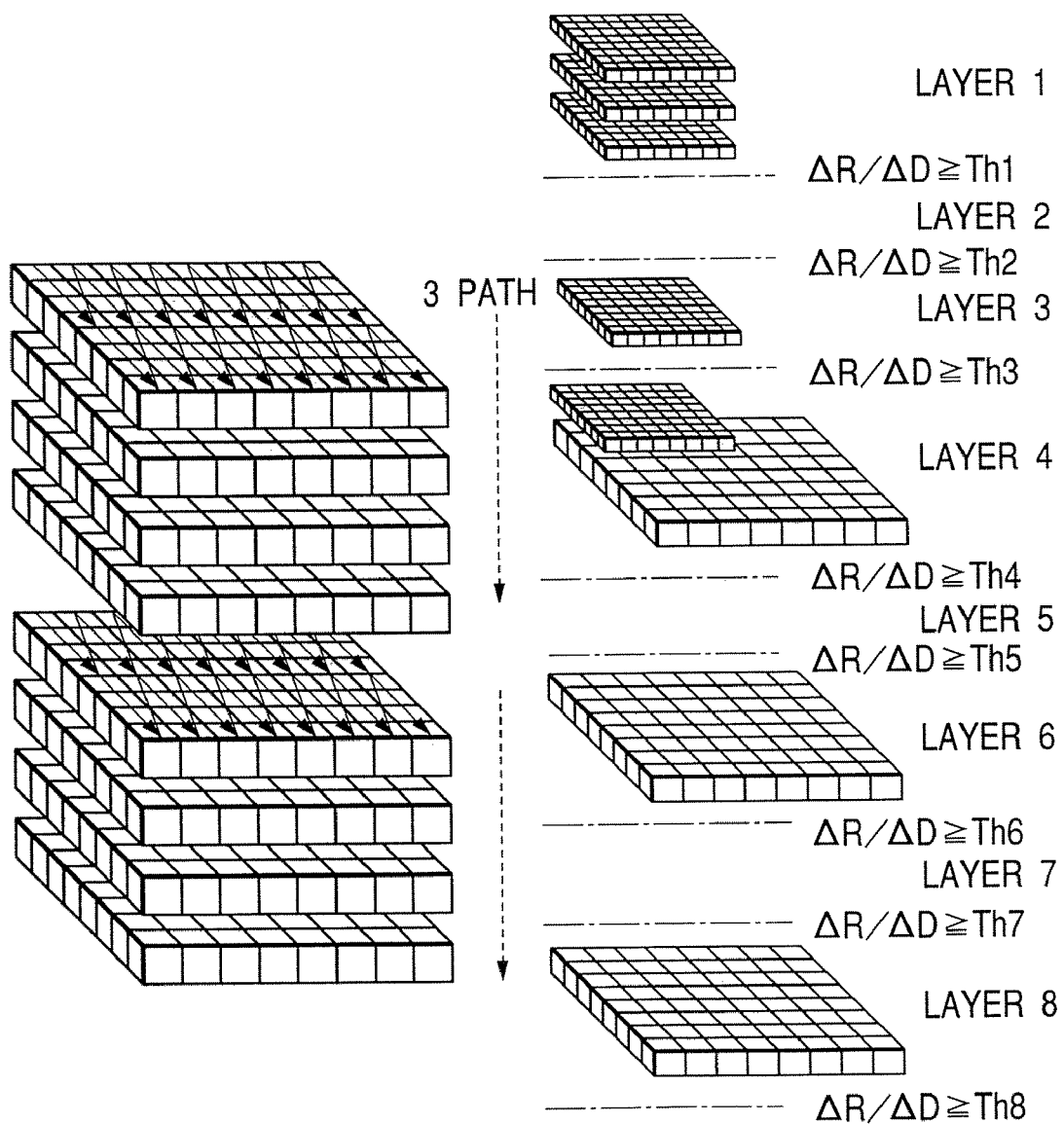
FIG. 25 is a conceptual diagram of bit plane processing performed during the encoding processing.

During Entropy encoding is performed, as shown in FIG. 25, such that image data of a unit of a code block is processed in units of bit planes from an upper bit to a lower bit. As indicated by arrows in FIG. 25, each bit plane is horizontally scanned in units of vertical four pixels. When doing so, an encoding model unit 551a (see FIG. 24) of the entropy encoding unit 55a classifies respective bits into 19 models through the scanning performed three times for each bit and converts the 19 models into binarized data.

An arithmetic coding unit 552a compresses the binarized data from the encoding model unit 551a through high-efficiency arithmetic encoding. Here, the arithmetic encoding unit 552a performs data encoding from an upper bit to a lower bit, which results in a situation where the encoding is performed in the order of magnitude of influence on image quality. Therefore, as shown in FIG. 25, it is possible to perform grouping using predetermined values concerning the magnitude of influence.

Next, in the stream forming unit 56, a ΔR/ΔD calculation unit 561 calculates the magnitude of >influence of each encoded bit plane of the code block on the image quality. Then, a layer discrimination unit 562 discriminates a layer, to which the encoded bit plane belongs, through comparison with the predetermined values (Th1 to Th8) and stores it in a work memory 563 together with the data of the encoded bit plane of the code block. Finally, a packet generation unit 564 reads the encoded data of the code block from the work memory 563 in units of layers, gives header information to the data, and packetizes the data.

The thus-generated packets are each a collection of data having the same image quality (layer) and the same number of pixels (sub-bands), so that it becomes possible to decode image data having a predetermined image quality and a predetermined number of pixels with a packet data extraction method.

The recording system of the video camera that is the first embodiment of the present invention has been described above.

Figure 2:
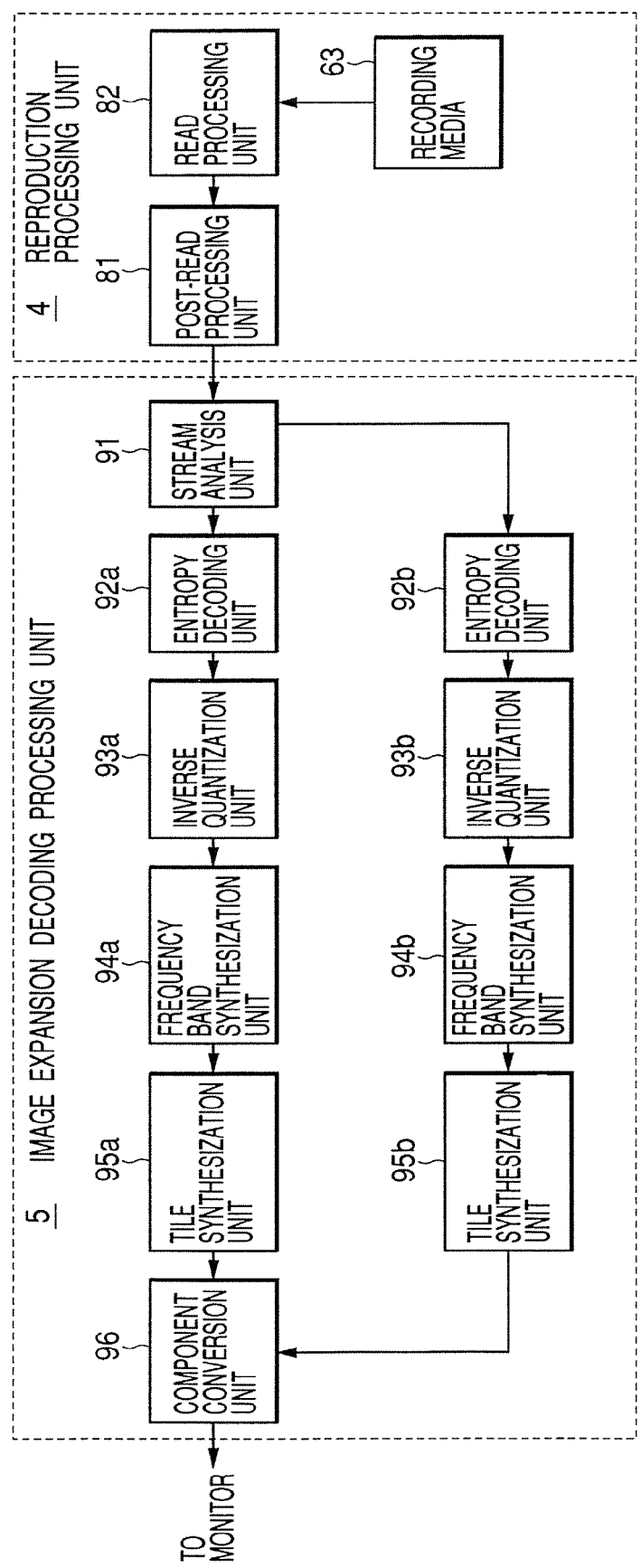
FIG. 2 is a block diagram of a reproduction system of the video camera that is the first embodiment of the present invention.

Next, a construction of a reproduction system that is capable of reading the compression-encoded image data recorded by the recording system described above will be described. FIG. 2 is a block diagram of the reproduction system of the video camera that is the first embodiment of the present invention.

Referring to FIG. 2, the video camera mainly includes a reproduction processing unit 4 and an image expansion decoding processing unit 5. A concrete construction of the reproduction system of the video camera and an operation thereof will be described below.

The reproduction processing unit 4 includes a read processing unit 82 for reading data from the recording medium 63 described above and a post-read processing unit 81 for extracting encoded data from the read data.

On the other hand, the image expansion decoding processing unit 5 includes a stream analysis unit 91 for extracting luminance data and chrominance data from the encoded data with reference to header information and the like, an entropy decoding unit 92a for expansion-decoding the extracted luminance data, an inverse quantization unit 93a for restoring wavelet coefficients from the expanded quantization data, a frequency band synthesization unit 94a for restoring image data of each tile by performing inverse conversion on the restored wavelet coefficients, a tile synthesization unit 95a for restoring one frame image from the restored title image data, and a component conversion unit 96 for synthesizing the restored luminance frame image with chrominance frame images and converting the synthesized frame images into a signal in a format suited for displaying on a not-shown monitor. Note that processing that is the same as the above-mentioned processing performed on the luminance data is performed on the chrominance data by blocks 92b to 95b shown in FIG. 2. The contents of this processing are the same as those described above and therefore will not be described again. Also, in FIG. 2, the luminance component is processed by the blocks 52a to 55a and the chrominance components are processed by the blocks 92b to 95b, respectively. In reality, however, these components may be processed by the same blocks.

An operation for restoring compression-encoded and recorded data with the construction described above will be described below.

In the reproduction processing unit 4, data recorded on the recording media 63 is read out by the read processing unit 82, and the post-read processing unit 81 extracts encoded data from the data read out in a predetermined format. Then, the extracted encoded data is supplied to the image expansion decoding processing unit 5.

In the image expansion decoding processing unit 5, the stream analysis unit 91 analyzes the header information of the supplied data and reads out encoded data necessary for decoding. When doing so, luminance data and chrominance data of the encoded data are separately read out.

Following this operation, the entropy decoding unit 92a expansion-decodes the luminance data (Y) of the arithmetic-encoded data. Then, the inverse quantization unit 93a inversely quantizes the decoded luminance data, thereby restoring the values of conversion coefficients (wavelet coefficients) obtained through the frequency band division. The restored conversion coefficients belong to each frequency band, so that the frequency band synthesization unit 94a synthesizes the conversion coefficients in respective frequency bands (performs inverse wavelet conversion). As a result, image data of one frame is restored in units of small areas (tiles). Then, the tile synthesization unit 95a synthesizes the restored tile image data, thereby generating one frame image.

In the same manner as in the case of the luminance data (Y), the chrominance data (Cb, Cr) is processed by the blocks 92b to 95b and is restored as one frame image.

The restored luminance data and chrominance data are synthesized by the component conversion unit 96, are converted into a transmission format suited for the not shown monitor, and are outputted from the image expansion decoding processing unit 5 to the monitor.

The reproduction system of the video camera that is the first embodiment of the present invention has been described above.

As described above, normal subject data captured by the camera is subjected to image processing as appropriate in the camera processing unit and is further subjected to data compression in the image compression encoding processing unit. Then, the compression-encoded data is recorded on the recording medium in the recording processing unit. Also, the encoded data recorded on the recording medium is read out by the reproduction processing unit, is expanded into the image expansion decoding processing unit, and is outputted to the monitor or the like.

Next, image processing in accordance with illuminance and control thereof that are the feature of this embodiment will be described.

Figure 3:
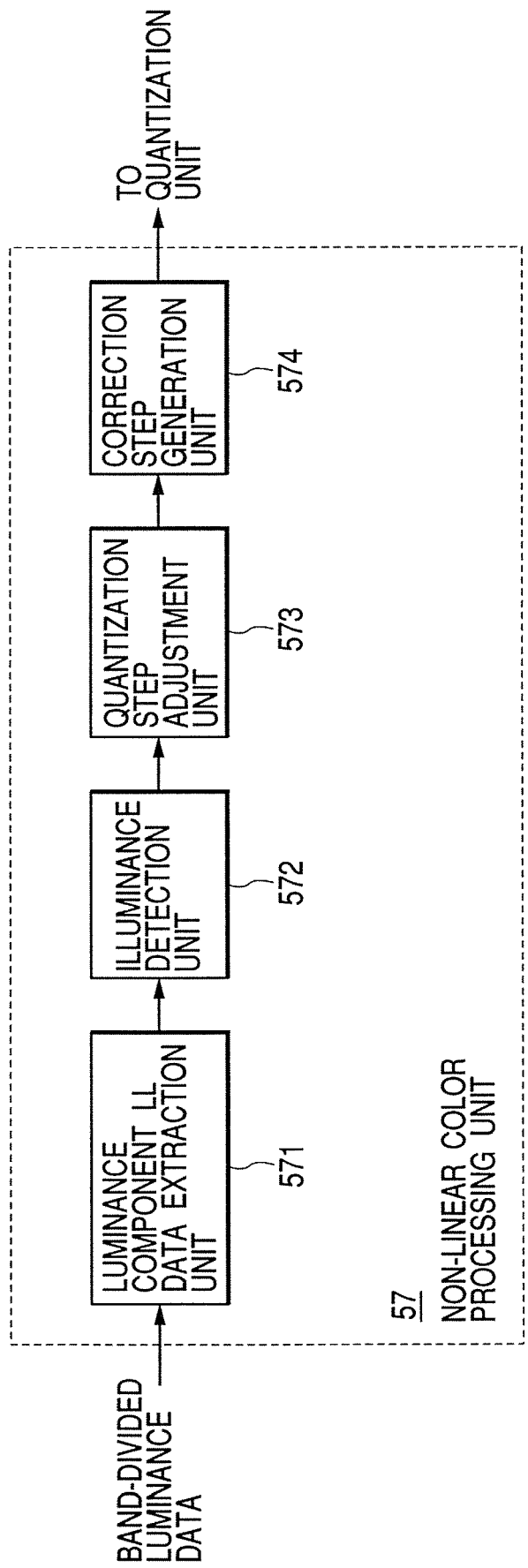
FIG. 3 is a block diagram of a non-linear chrominance processing unit according to the first embodiment of the present invention.

FIG. 3 is a block diagram of the non-linear color processing unit 57. Reference numeral 571 denotes an luminance component LL data extraction unit for extracting an LL coefficient of a luminance (Y) component, numeral 572 an illuminance detection unit, numeral 573 a quantization step adjustment unit for setting a quantization step for each conversion coefficient of color difference data (Cb, Cr) independently of frequency bands, and numeral 574 a correction step generation unit for determining a quantization step for each conversion coefficient of luminance data (Y) independently of frequency bands in accordance with a manipulation amount of a predetermined chrominance quantization step.

Figure 5:
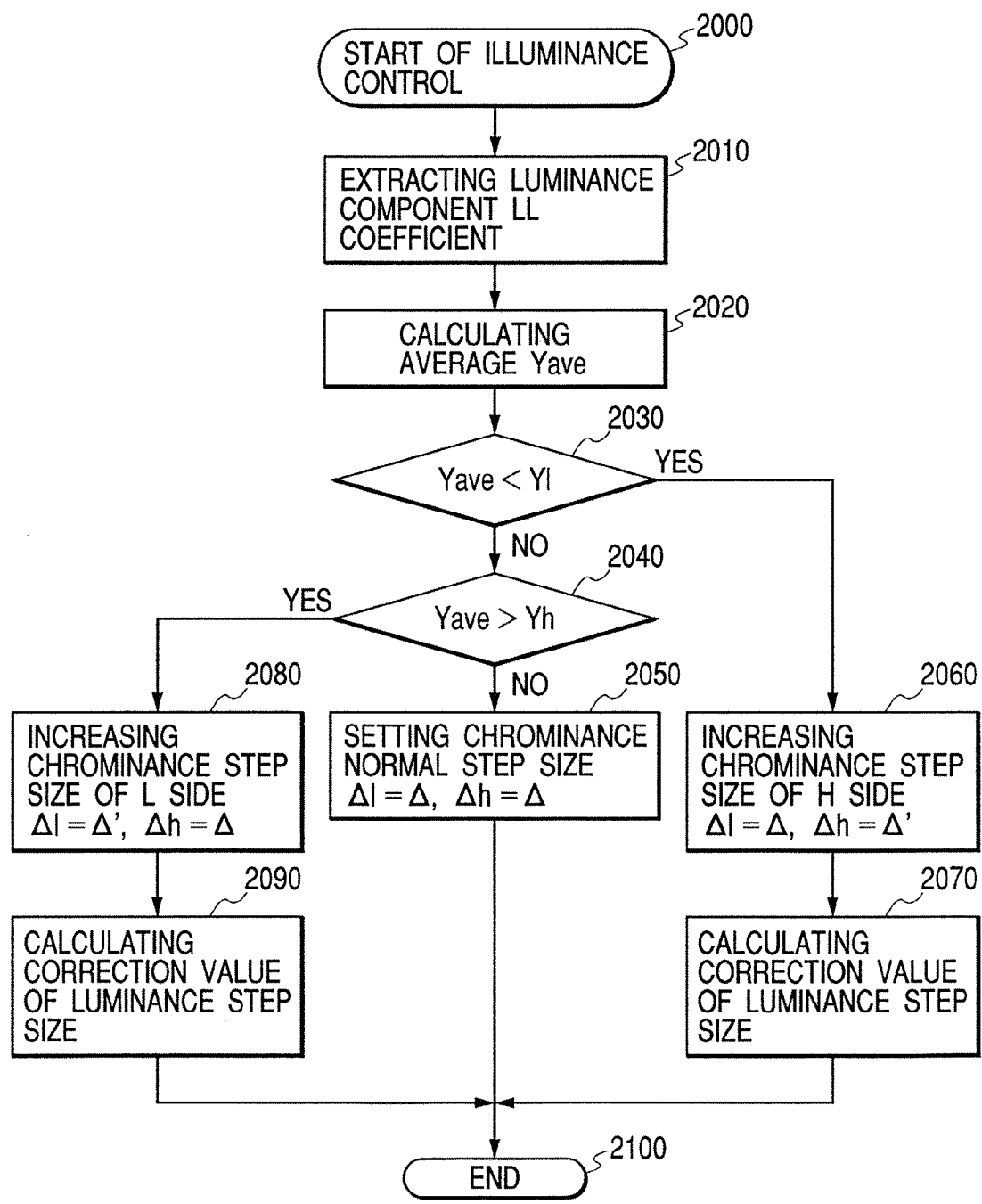
FIG. 5 is a flowchart showing processing according to the first embodiment.

First, an operation of each unit at the time of low illuminance will be described with reference to a flowchart shown in FIG. 5.

Figure 4:
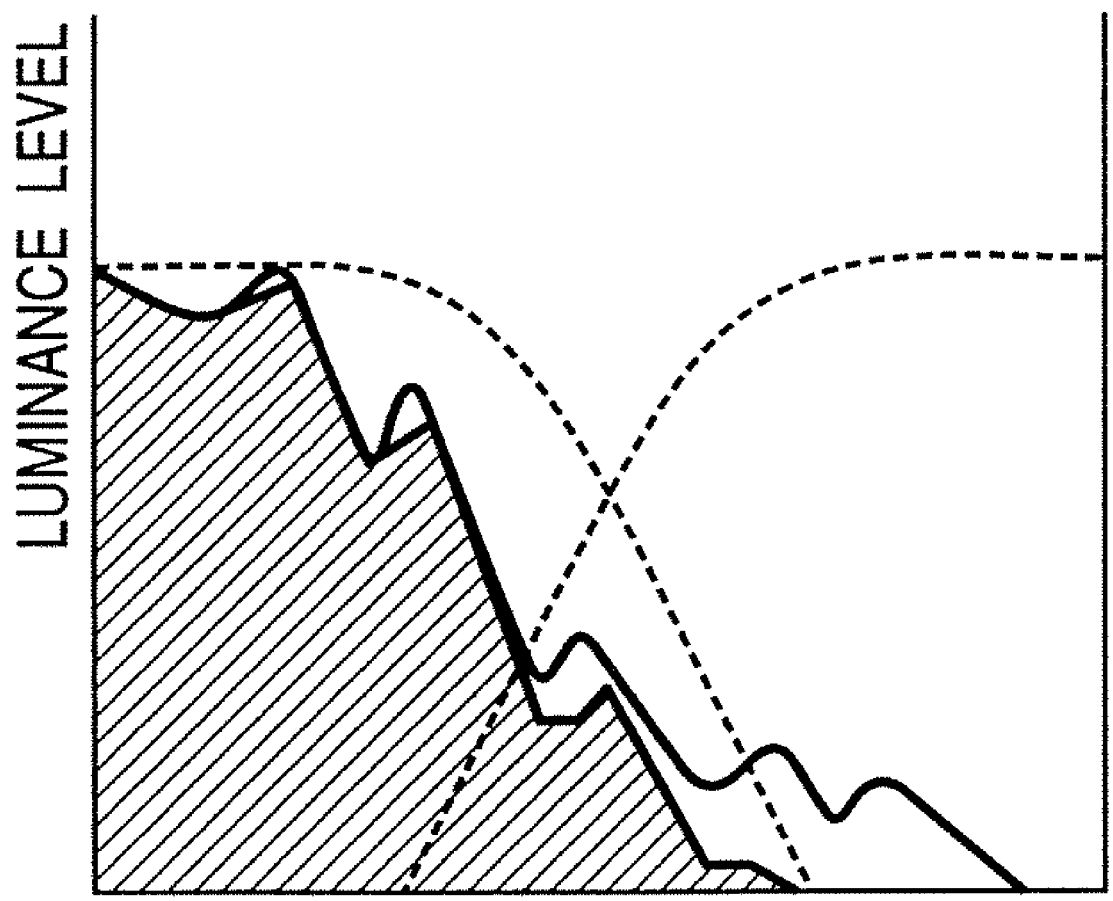
FIG. 4 shows an example of a frequency distribution of an image.

When a control operation in accordance with illuminance is started (step 2000), the LL data extraction unit 571 extracts low-frequency sub-band coefficient LL data of a luminance (Y) component (region given sloped lines in FIG. 4) (step 2010). Then, the illuminance detection unit 572 calculates an average value Yave of the extracted coefficients (step 2020), and compares the average value Yave with a predetermined value Yl (step 2030). Here, at the time of low illuminance, the low-frequency component of the luminance data should be small, so that if the advantage value Yave is smaller than the predetermined value Yl, the illuminance detection unit 572 decides that the illuminance is low.

When the decision based on such an algorithm by the illuminance detection unit 572 is made, the quantization step adjustment unit 573 increases a quantization step size $\Delta h$ for a high-frequency-side conversion coefficient of a color difference data (Cb, Cr) component. Here, a quantization step size $\Delta l$ for a low-frequency-side conversion coefficient is set at a normal quantization step $\Delta$, but at the time of low illuminance, the high-frequency quantization step size $\Delta h$ is set at $\Delta'$ that is larger than $\Delta$ (step 2060). This case is illustrates in FIG. 6. Note that information showing $\Delta'$ is not contained in the header information of encoded data, and therefore this quantization step size is used only on the encoding side. Then, in order to correct a color balance shift resulting from this changing of the quantization step for the high-frequency component of the chrominance data, the correction step generation unit 574 generates a correction amount of a quantization step for a high-frequency component of the luminance data (step 2070).

Figure 7:
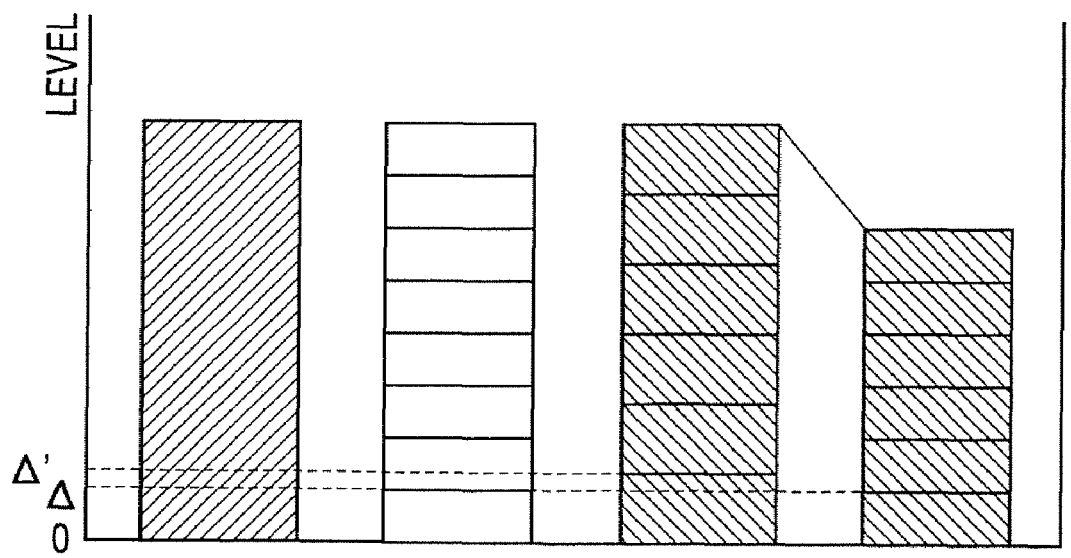
FIG. 7 is an explanatory diagram of an inverse quantization step size at the time of decoding.
Figure 8A:
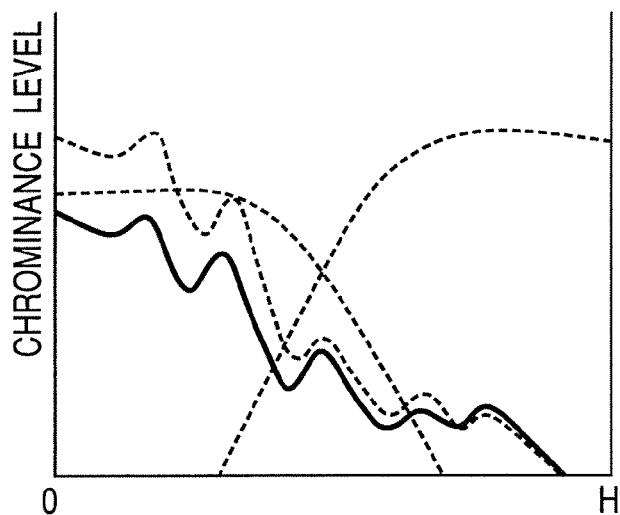
FIGS. 8A, 8B, and 8C are each an explanatory diagram of a chrominance level suppressed in accordance with illuminance.
Figure 8B:
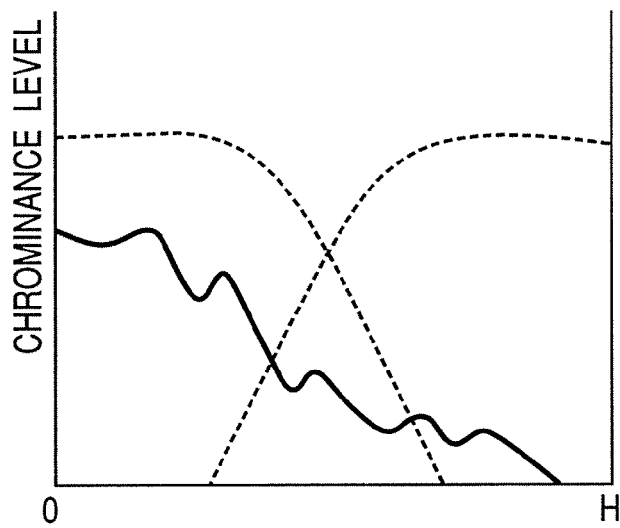
Figure 8C:
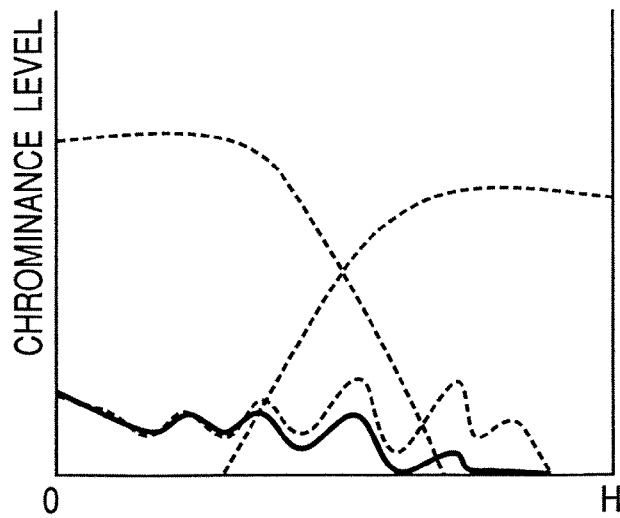

Next, a case where the above-mentioned normal encoding manipulation is performed by quantizing the high-frequency-side conversion coefficient using the quantization step set larger than the standard quantization step in this manner will be described with reference to FIGS. 7, 8A, 8B, and 8C. Note that FIG. 8A shows a state where low-frequency data is suppressed, FIG. 8B shows a normal state, and FIG. 8C shows a state where high-frequency data is suppressed.

During inverse quantization processing (by the inverse quantization unit 93b in FIG. 2) at the time of decoding, an inverse quantization step $\Delta h$ for the high-frequency-side conversion coefficient as well as an inverse quantization step $\Delta l$ for the low-frequency-side conversion coefficient are set at the normal step size $\Delta$. That is, at the time of decoding, the high-frequency-side conversion coefficient is inversely quantized using a quantization step ($\Delta$) that is smaller than the quantization step ($\Delta'$) used at the time of encoding. Consequently, as shown in FIG. 7, a level restored as a result of the inverse quantization becomes smaller. This means that as a result of the restoration, the state shown in FIG. 8C is obtained in which only the high-frequency data is suppressed.

In this embodiment, at the time of low illuminance, the low-frequency chrominance component is left, and only the high-frequency noise component that is a major cause of color-unevenness is suppressed (limited). As a result, it becomes possible to suppress the occurrence of unnatural color-unevenness.

Also, in the present embodiment, the processing for removing the color-unevenness is performed only on the high-frequency component, and therefore color information in low frequencies is retained. As a result, it becomes possible to precisely retain the color information of the object even at the time of low illuminance. In particular, assuming that an image is clipped from a moving picture and is printed, if a low-illuminance part is converted into achromatic color like in the conventional case, this converted part becomes visually conspicuous. In the present embodiment, however, the achromatic color processing is performed only for a specific frequency band, and therefore the color information is retained in the low-frequency coefficient. As a result, it becomes possible to provide a still image having image quality sufficient for appreciation.

Further, in the present embodiment, at the time of encoding, high-frequency-side data that is not so important at the time of low illuminance is processed using a coarse quantization step ($\Delta'$), so that there is also provided an effect that the efficiency of encoding is improved as compared with a conventional method with which data subjected to image processing on a camera side is processed using a uniform quantization step ($\Delta$).

Also, in the present embodiment, an LL image generated by frequency-band division at the time of encoding is used for the illuminance detection. As a result, a specifically designed detection filter that is conventionally used for processing on a conventional camera side becomes unnecessary, which achieves cost reduction.

Next, referring again to FIG. 5, an operation at the time of high illuminance will be described. Like in the case of low illuminance, the LL data extraction unit 571 extracts low-frequency sub-band coefficient LL data of a luminance (Y) component (region given sloped lines in FIG. 4) (step 2010). Then, the illuminance detection unit 572 calculates an average value Yave of the extracted coefficients (step 2020), and compares the average value Yave with the predetermined value Yl (step 2030). If the advantage value Yave is greater than the predetermined value Yl, the illuminance detection unit 572 next compares the advantage value Yave with another predetermined value Yh (step 2040). Here, at the time of high illuminance, the low-frequency component of the luminance data is large, so that if the advantage value Yave is greater than the predetermined value Yh, the illuminance detection unit 572 decides that illuminance is high.

Figure 6:
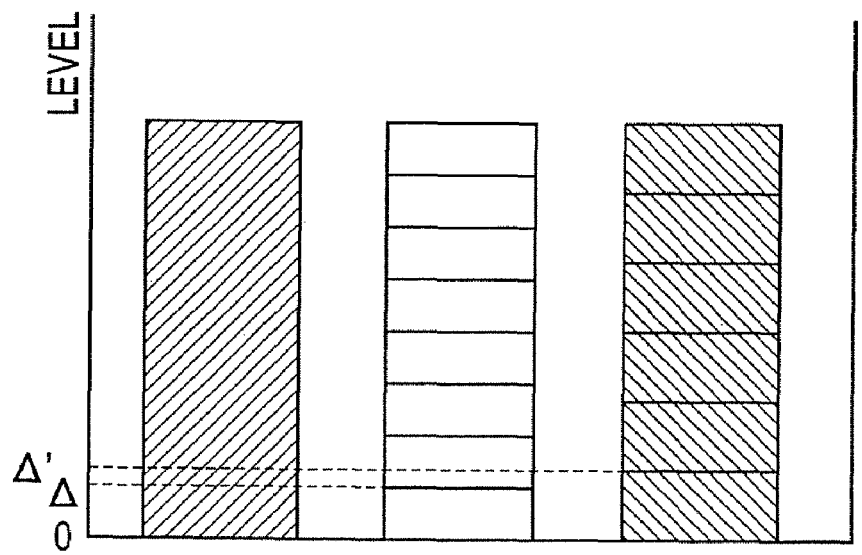
FIG. 6 is an explanatory diagram of a quantization step size at the time of encoding.

When the decision based on this algorithm by the illuminance detection unit 572 is made, the quantization step adjustment unit 573 increases the quantization step size $\Delta l$ for a low-frequency-side conversion coefficient of a color difference data (Cb, Cr) component. Here, at the time of high illuminance, the quantization step size $\Delta h$ for a high-frequency-side conversion coefficient is set at the normal quantization step $\Delta$, but the low-frequency quantization step size $\Delta l$ is set at $\Delta l$ that is larger than $\Delta$ (step 2080). This case is illustrated in FIG. 6. Note that information showing $\Delta'$ is not contained in the header information of encoded data, and therefore this quantization step size is used only on the encoding side. Then, in order to correct a color balance shift resulting from this changing of the quantization step for the low-frequency component of the chrominance data, the correction step generation unit 574 generates a correction amount of a quantization step for the low-frequency component of the luminance data (step 2090).

Next, a case where the above-mentioned normal encoding manipulation is performed by quantizing the low-frequency-side conversion coefficient using the quantization step set larger than the standard quantization step in this manner will be described with reference to FIGS. 7, 8A, 8B, and 8C. Note that FIG. 8A shows a state where low-frequency data is suppressed, FIG. 8B shows a normal state, and FIG. 8C shows a state where high-frequency data is suppressed.

During inverse quantization processing (by the inverse quantization unit 93b in FIG. 2) at the time of decoding, the inverse quantization step $\Delta l$ for the low-frequency-side conversion coefficient as well as the inverse quantization step $\Delta h$ for the high-frequency-side conversion coefficient are set at the normal step size $\Delta$. That is, at the time of decoding, the low-frequency-side conversion coefficient is inversely quantized using a quantization step ($\Delta$) that is smaller than the quantization step ($\Delta'$) used at the time of encoding. Consequently, as shown in FIG. 7, a level restored as a result of the inverse quantization becomes smaller. This means that as a result of the restoration, the state shown in FIG. 8A is obtained in which only the low-frequency data is suppressed.

In the present embodiment, at the time of high illuminance, the high-frequency chrominance component is retained, and only a low-frequency level that is a major cause of a color shift occurring due to a slight deviation of a color temperature is suppressed (limited). As a result, it becomes possible to suppress the occurrence of an unnatural color shift.

Also, in the present embodiment, the color shift suppression is performed only on the low-frequency component, and the color information in high frequencies is retained. As a result, it becomes possible to precisely retain color change information of an object even at the time of high illuminance. In particular, when an image is clipped from a moving picture and is printed, if a high-illuminance part is uniformly converted into achromatic color like in the conventional case, the continuity of color is lost, and this converted part becomes visually conspicuous. In the present embodiment, however, the achromatic color processing is performed only for a specific frequency band, and therefore the color change information is retained in the high-frequency coefficient. As a result, it becomes possible to provide a still image having image quality sufficient for appreciation.

Further, in the present embodiment, the low-frequency-side data exhibiting less changes at the time of high illuminance is processed with a coarse quantization step ($\Delta'$) at the time of encoding, so that the efficiency of encoding is improved as compared with a conventional method with which data subjected to image processing on a camera side is processed using a uniform quantization step ($\Delta$).

Also, in the present embodiment, an LL image generated by frequency band division at the time of encoding is used for illuminance detection, so that a specifically designed detection filter conventionally used for processing on a camera side becomes unnecessary, which achieves cost reduction.

Now, referring again to FIG. 5, if the result of the comparison in step 2040 is that the average value Yave is not greater than the predetermined value Yh, that is, if it is not decided that illuminance is high, a chrominance normal step size is set (step 2050).

The first embodiment of the present invention, in which image processing, in particular, image compression encoding processing is controlled in accordance with illuminance, is described above.

Second Embodiment

Figure 9:
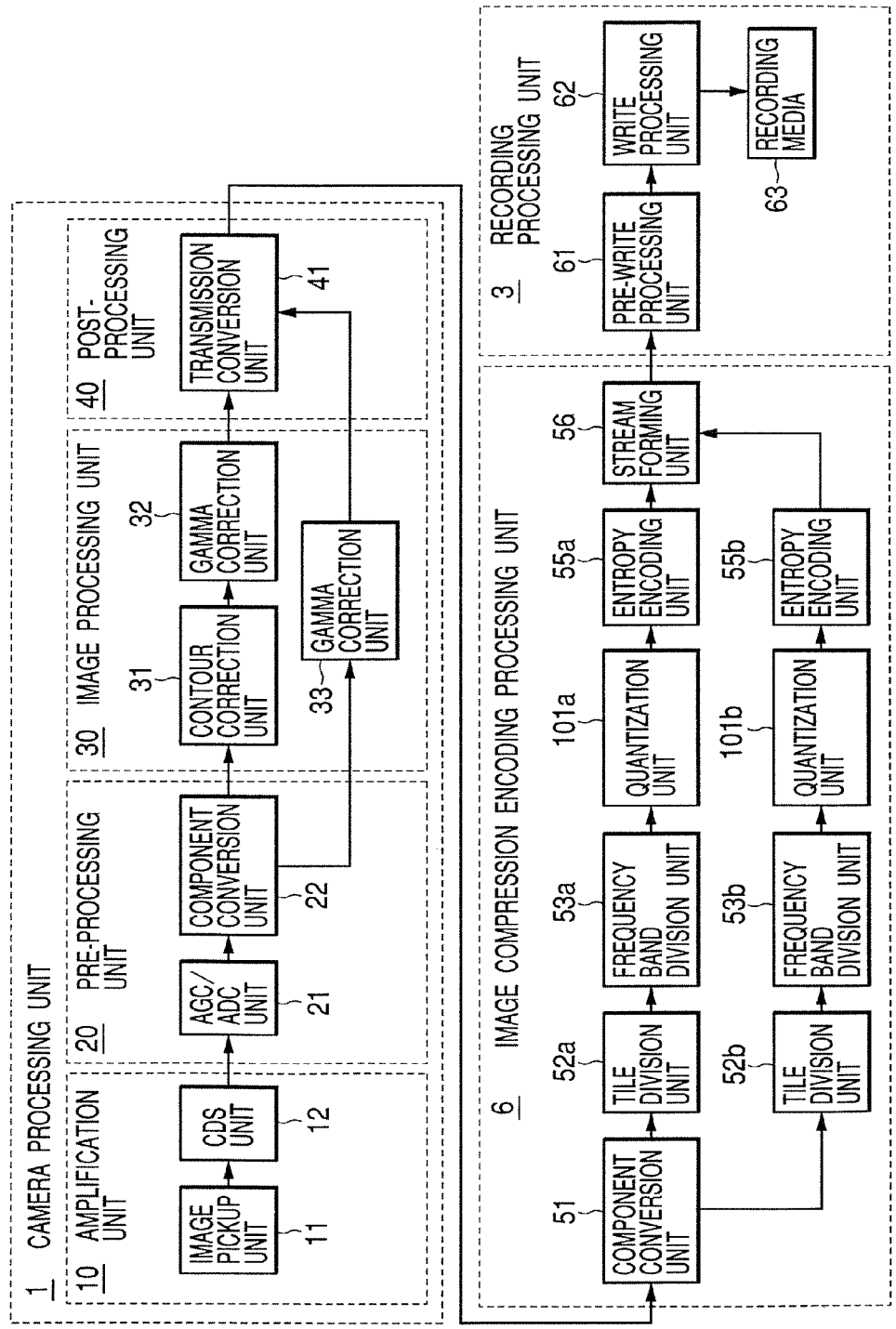
FIG. 9 is a block diagram of a recording system of a video camera that is a second embodiment of the present invention.
Figure 10:
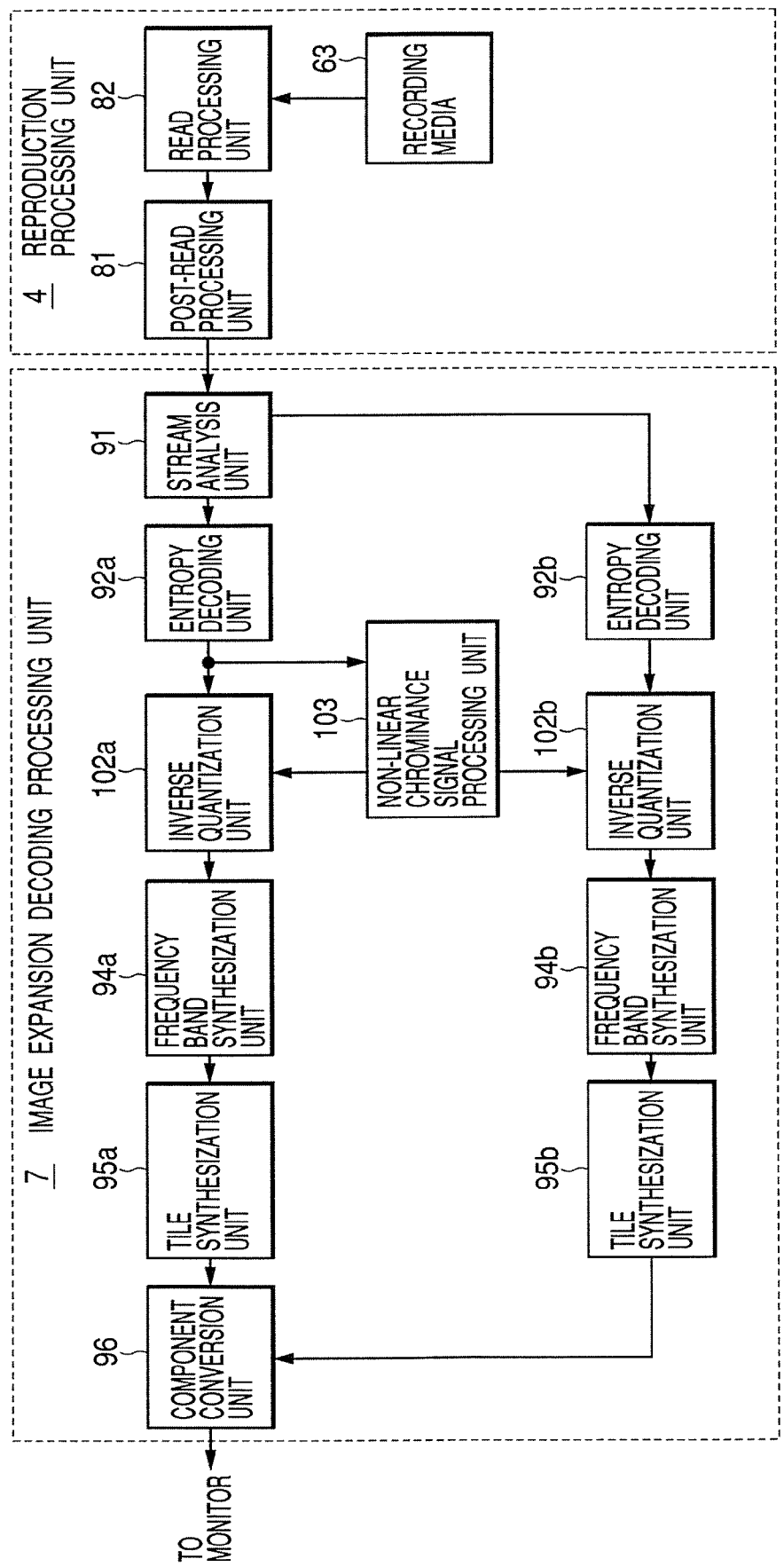
FIG. 10 is a block diagram of a reproduction system of the video camera that is the second embodiment of the present invention.

Next, a video camera that is a second embodiment of the present invention will be described. FIG. 9 is a schematic block diagram of a recording system of the video camera, and FIG. 10 is a schematic block diagram of a reproduction system corresponding to FIG. 9. In the first embodiment, the non-linear chrominance processing is performed on the image compression encoding processing unit side. In this second embodiment, however, the non-linear chrominance processing is performed on the image expansion decoding processing side. Note that in FIGS. 9 and 10, the operation of each block given the same reference numeral as in FIGS. 1 and 2 is the same as that described in the first embodiment and therefore will not be described again.

In FIG. 9, the construction of the camera processing unit 1 and the construction of the recording processing unit 3 are the same as those described in the first embodiment, but an image compression encoding processing unit 6 differs from the image compression encoding processing unit 2 of the first embodiment in that no non-linear chrominance signal processing unit 103 is provided. Accordingly, quantization units 101a and 101b perform only quantization processing using a predetermined step size.

In FIG. 10, the construction of the reproduction processing unit 4 is the same as that described above, but an image expansion decoding processing unit 7 differs from the image expansion decoding processing unit 5 of the first embodiment in that a non-linear chrominance signal processing unit 103 is provided and processing of inverse quantization units 102a and 102b is changed in accordance with a predetermined step size and an operation result of the non-linear chrominance signal processing unit 103.

Figure 12:
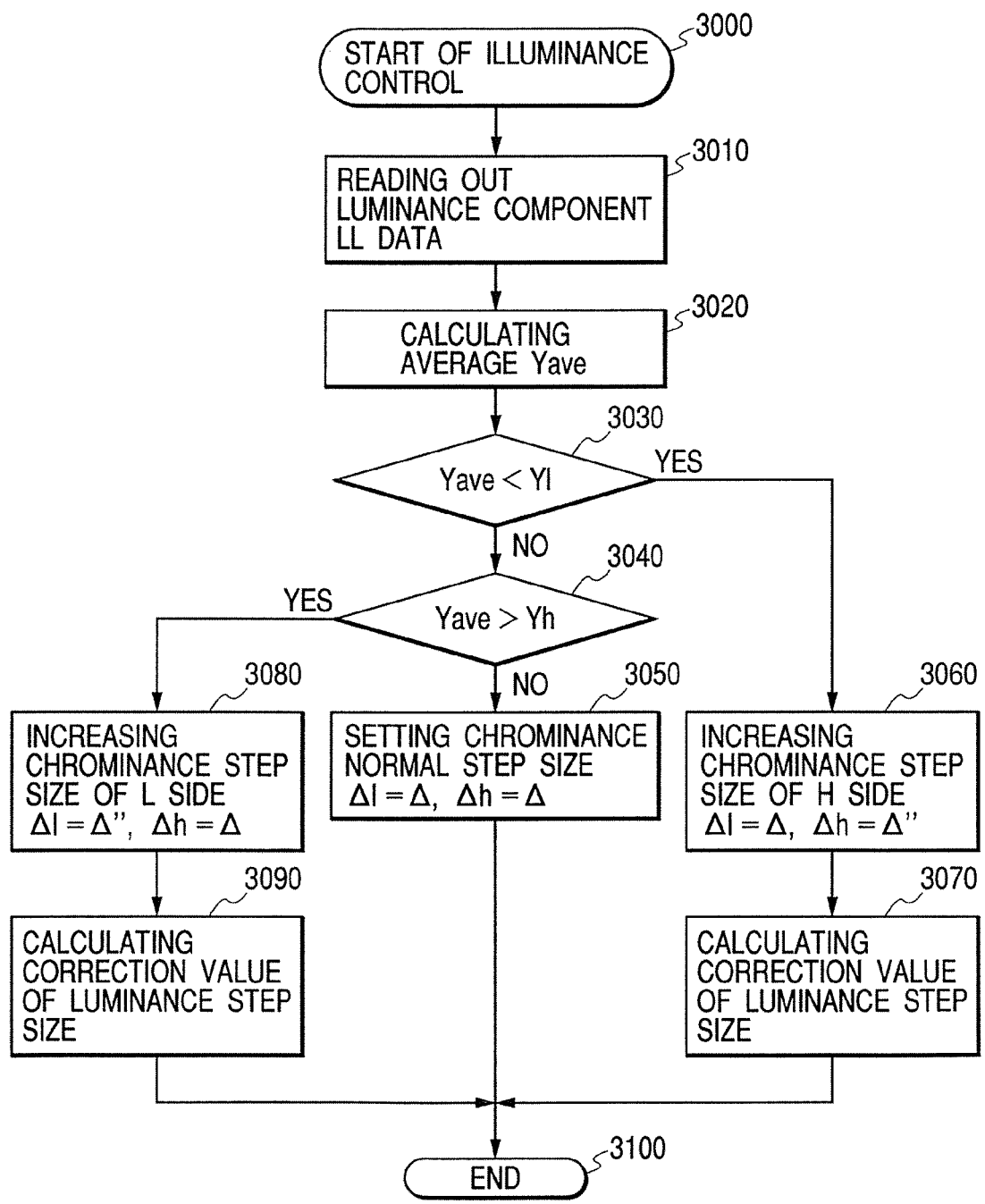
FIG. 12 is a flowchart showing processing according to the second embodiment.
Figure 13A:
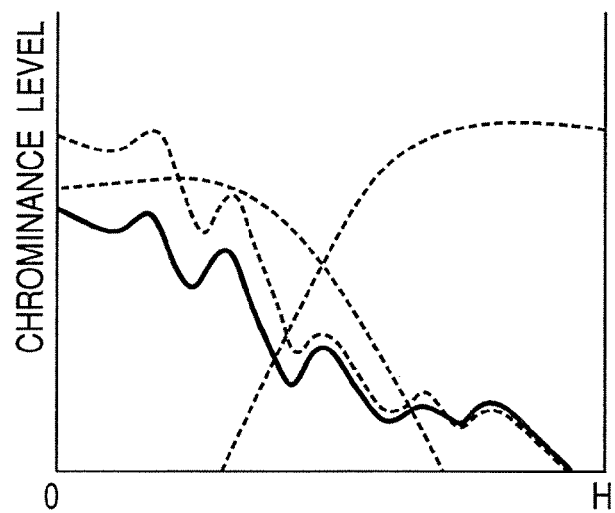
FIGS. 13A, 13B, and 13C are each an explanatory diagram of a chrominance level suppressed in accordance with illuminance.
Figure 13B:
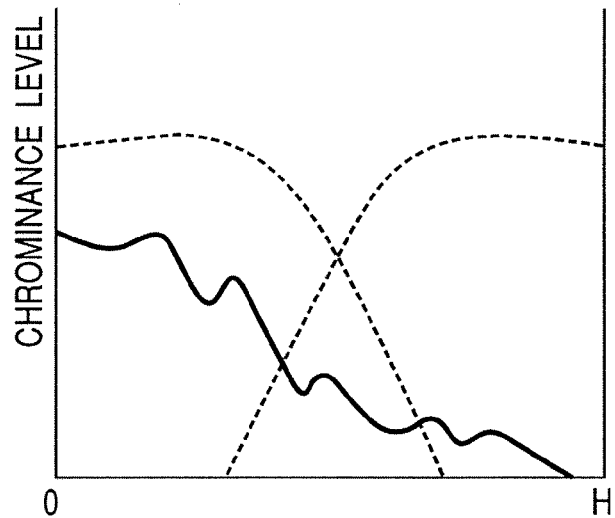
Figure 13C:
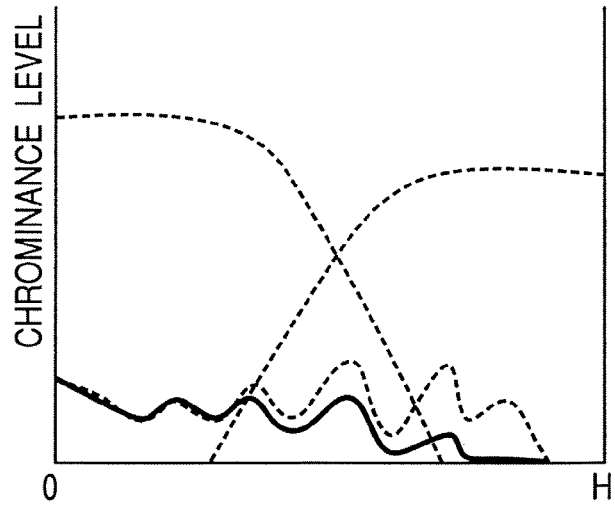

Next, image processing in accordance with illuminance at the time of reproduction, that is a feature of this embodiment, will be described with reference to FIGS. 11, 12, 13A, 13B, and 13C. Note that FIG. 13A shows a state where low-frequency data is suppressed, FIG. 13B shows a normal state, and FIG. 13C shows a state where high-frequency data is suppressed.

Figure 11:
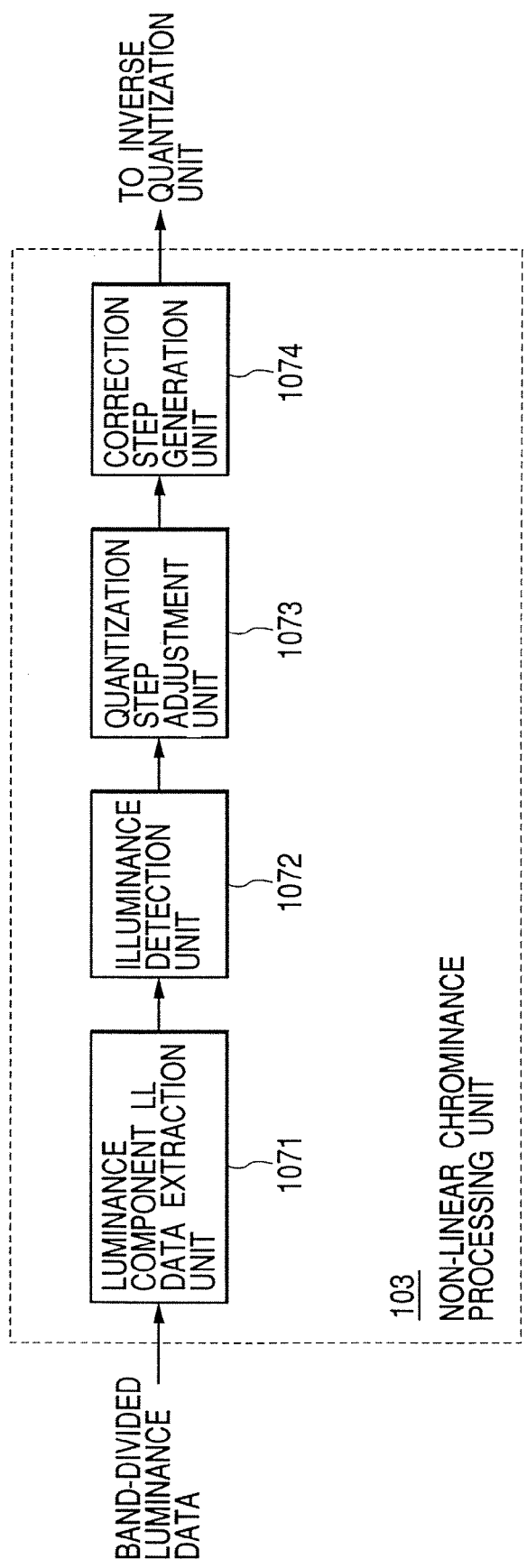
FIG. 11 is a block diagram of a non-linear chrominance processing unit according to the second embodiment of the present invention.

FIG. 11 shows a construction of the non-linear chrominance signal processing unit 103. In this drawing, reference numeral 1071 denotes an luminance component LL data extraction unit for extracting LL data of a luminance (Y) component, numeral 1072 an illuminance detection unit, numeral 1073 a quantization step adjustment unit for setting an inverse quantization step for conversion data of color difference data (Cb, Cr) independently of frequency bands, and numeral 1074 a correction step generation unit for determining an inverse quantization step for conversion data of the luminance data (Y) independently of frequency bands in accordance with a manipulation amount of a certain chrominance quantization step.

An operation at the time of low luminance will be described with reference to a flowchart shown in FIG. 12.

When a control operation in accordance with illuminance is started (step 3000), the LL data extraction unit 1071 extracts low-frequency sub-band coefficient LL data of a luminance (Y) component (step 3010). Then, the illuminance detection unit 1072 calculates an average value Yave of the extracted coefficients (step 3020), and compares the average value Yave with a predetermined value Yl (step 2030). Here, at the time of low illuminance, the low-frequency component of the luminance-data is small. Therefore, if the illuminance detection unit 1072 decides that Yave is smaller than Yl, the quantization step adjustment unit 1073 decides an quantization step size $\Delta h$ for a high-frequency-side conversion coefficient of a color difference data (Cb, Cr) component. Here, at the time of low illuminance, a quantization step size $\Delta l$ for a low-frequency-side conversion coefficient is set at the normal quantization step $\Delta$ (see FIG. 14) but the high-frequency quantization step size $\Delta h$ is set at $\Delta''$ that is smaller than $\Delta$ (step 3060). Then, in order to correct a color balance shift resulting from this changing of the quantization step for the high-frequency component of the chrominance data, the correction step generation unit 1074 generates a correction amount of a quantization step for a high-frequency component of the luminance data (step 3070).

Next, a case where the above-mentioned normal encoding manipulation is performed by inversely quantizing the high-frequency-side conversion coefficient using the quantization step ($\Delta''$) set smaller than the standard quantization step ($\Delta$) in this manner will be described with reference to FIG. 13.

Figure 14:
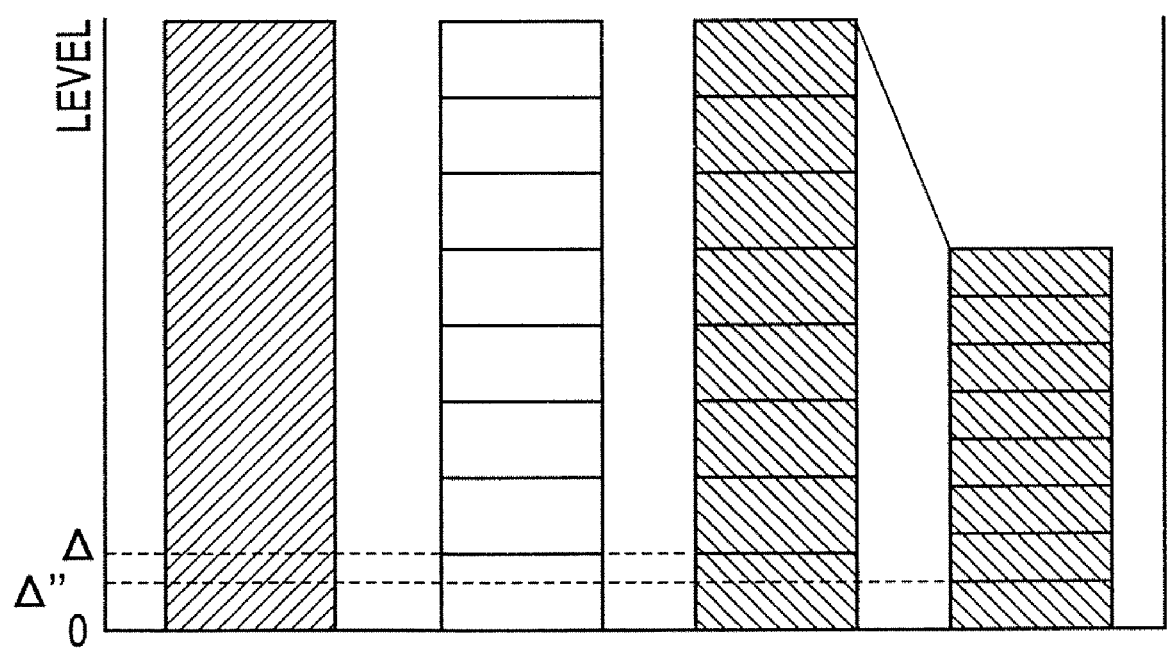
FIG. 14 is an explanatory diagram of an inverse quantization step size.
Figure 15:
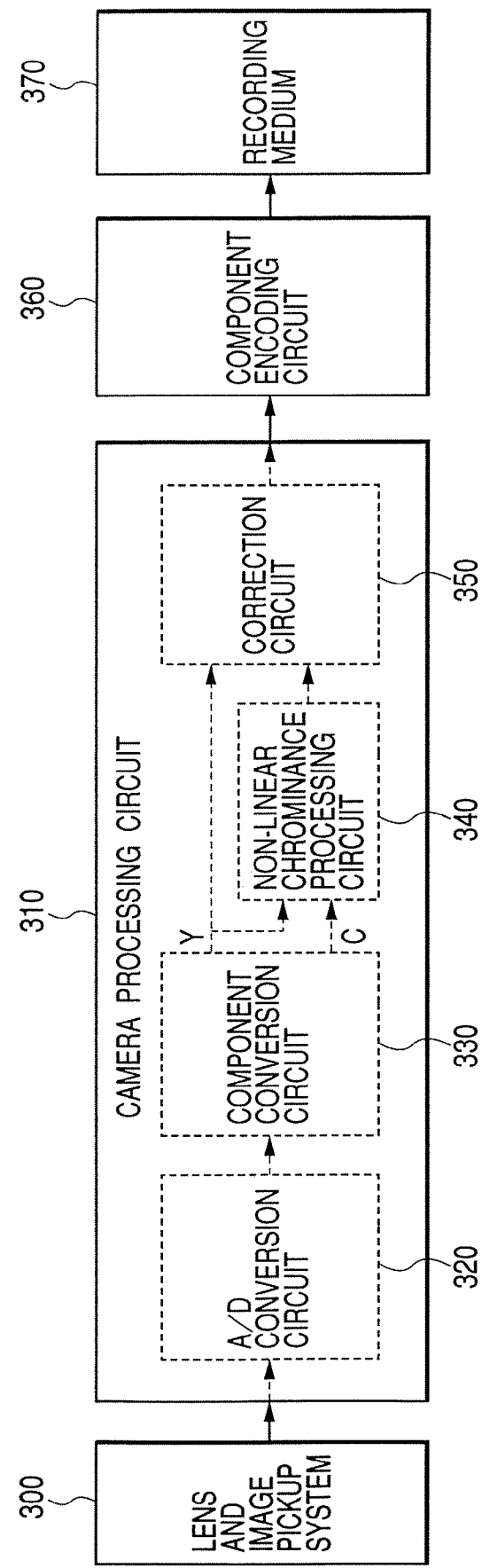
FIG. 15 is a schematic block diagram of a conventional video camera.
Figure 16:
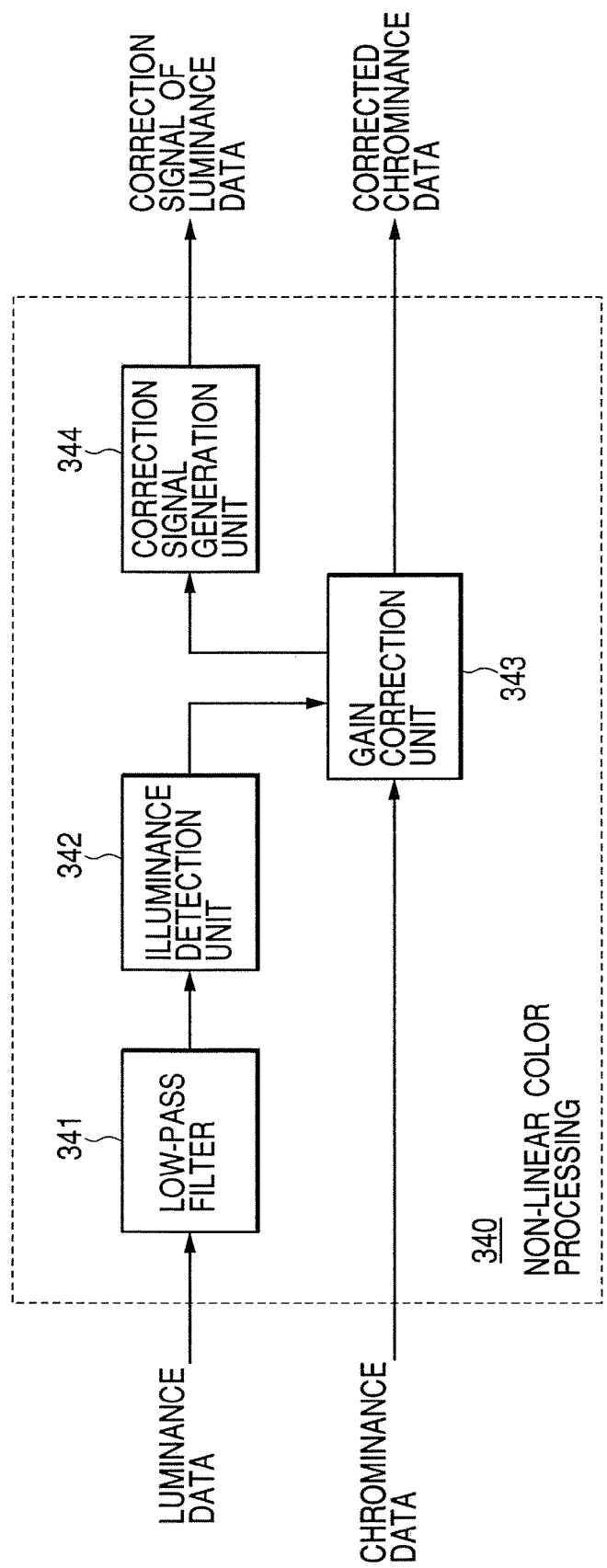
FIG. 16 is a schematic block diagram of a non-linear color processing circuit of the conventional video camera.
Figure 17A:
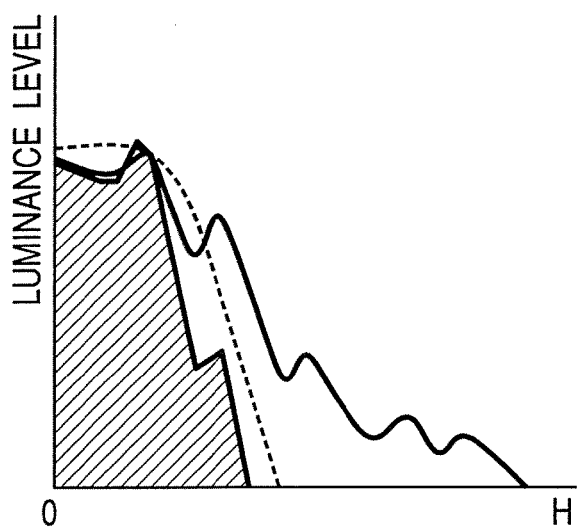
FIGS. 17A, 17B, and 17C each illustrate an example of conventional non-linear processing.
Figure 17B:
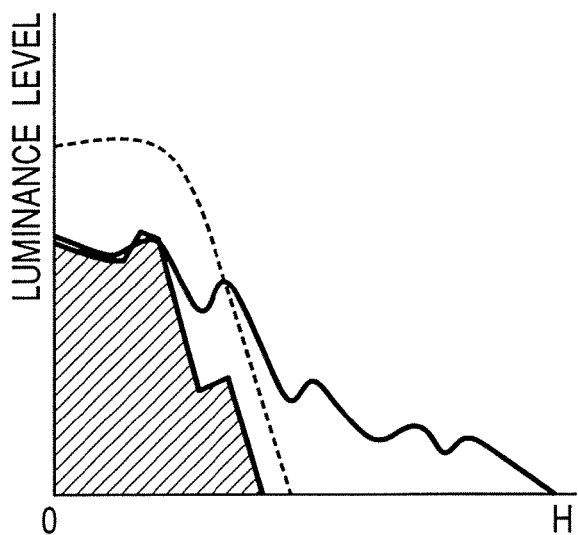
Figure 17C:
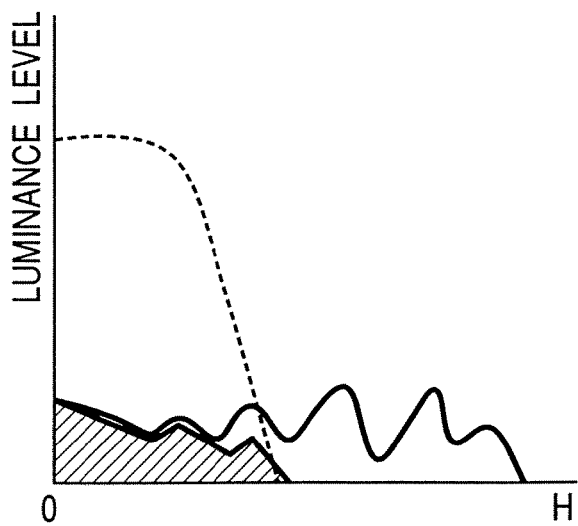
Figure 18:
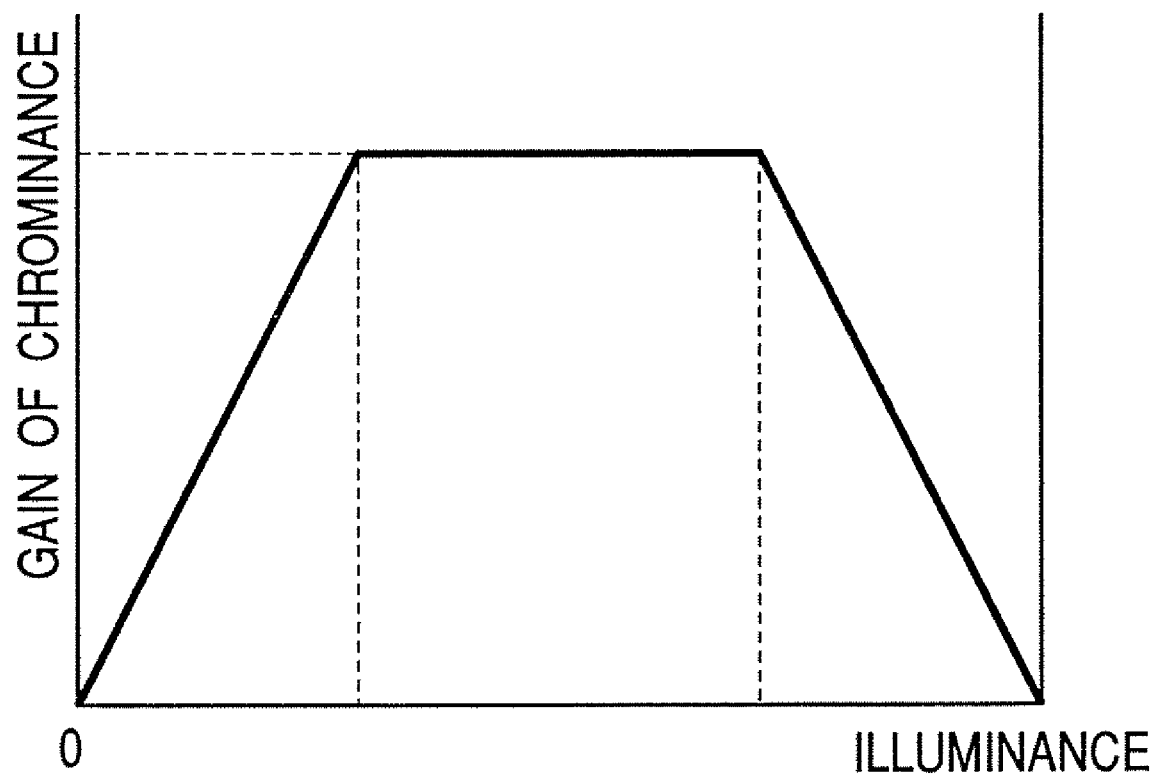
FIG. 18 shows an example of characteristics of the conventional non-linear processing.

During quantization processing (by the quantization unit 101b in FIG. 9) at the time of encoding, an inverse quantization step $\Delta h$ for the high-frequency-side conversion coefficient as well as an inverse quantization step $\Delta l$ for the low-frequency-side conversion coefficient are set at the normal step size $\Delta$. That is, at the time of decoding, the high-frequency conversion data is inversely quantized by the inverse quantization unit 102b in FIG. 10 using the quantization step ($\Delta''$) that is smaller than the quantization step ($\Delta$) used at the time of encoding. Accordingly, as shown in FIG. 14, a level restored as a result of the inverse quantization becomes smaller. This means that as a result of the restoration, the state shown in FIG. 13C is obtained in which only the high-frequency data is suppressed.

In the present embodiment, at the time of low illuminance, the low-frequency chrominance component is retained and only the high-frequency noise component that is a major cause of color-unevenness is suppressed (limited). As a result, it becomes possible to suppress the occurrence of unnatural color-unevenness.

Also, in the second embodiment, as in the first embodiment, the processing for removing the color-unevenness is performed only on the high-frequency component and therefore color information in low frequencies is retained. As a result, it becomes possible to precisely retain the color information of an object even at the time of low illuminance. In particular, when an image is clipped from a moving picture and is printed, if a low-illuminance part is converted into achromatic color like in the conventional case, this converted part becomes visually conspicuous. In the present embodiment, however, the achromatic color processing is performed only for a specific frequency band and therefore the color information is retained in the low-frequency coefficient. As a result, it becomes possible to provide a still image having image quality sufficient for appreciation.

Further, in the present embodiment, LL data necessary for frequency band synthesization at the time of decoding is used for the illuminance detection. As a result, a specifically designed detection filter conventionally required to perform processing on a camera side can be eliminated, which achieves cost reduction.

Next, referring again to FIG. 5, an operation at the time of high illuminance will be described.

As in the case of low illuminance, the LL data extraction unit 1071 extracts low-frequency sub-band LL data of a luminance (Y) component (step 3010). Then, the illuminance detection unit 1072 calculates an average value Yave of the extracted coefficients (step 3020), and compares the average value Yave with the predetermined value Yl (step 3030). If Yave is greater than Yl, the illuminance detection unit 1072 next compares Yave with another predetermined value Yh (step 3040). Here, at the time of high illuminance, the low-frequency component of the luminance data is large, so that if Yave is greater than Yh, the illuminance detection unit 1072 decides that illuminance is high. Then, the quantization step adjustment unit 1073 decides the inverse quantization step size $\Delta l$ for low-frequency conversion data of a color difference data (Cb, Cr) component. Here, at the time of high illuminance, the inverse quantization step size $\Delta h$ for high-frequency conversion data is set at the normal quantization step $\Delta$ (see FIG. 14) but the low-frequency inverse quantization step size $\Delta l$ is set at $\Delta''$ that is smaller than $\Delta$ (step 3080). Then, in order to correct a color balance shift resulting from this changing of the inverse quantization step for the low-frequency component of the chrominance data, the correction step generation unit 1074 generates a correction amount of an inverse quantization step for the low-frequency component of the luminance data (step 3090).

Next, a case where the low-frequency conversion data is inversely quantized using the quantization step ($\Delta''$) that is smaller than the standard quantization step ($\Delta$) will be described.

During quantization processing (by the quantization unit 101b in FIG. 9) at the time of encoding, the quantization step $\Delta l$ for the low-frequency conversion coefficient as well as the quantization step $\Delta h$ for the high-frequency conversion coefficient are set at the normal step size $\Delta$. That is, at the time of decoding, the low-frequency conversion data is inversely quantized using the inverse quantization step ($\Delta''$) that is smaller than the quantization step ($\Delta$) used at the time of encoding. Accordingly, as shown in FIG. 14, a level restored as a result of the inverse quantization becomes smaller. This means that as a result of the restoration, the state shown in FIG. 13A is obtained in which only the low-frequency data is suppressed.

In the present embodiment, at the time of high illuminance, the high-frequency chrominance component is retained and only the low-frequency level that is a major cause of a color shift occurring due to a slight deviation of a color temperature is suppressed (limited). As a result, it becomes possible to suppress the occurrence of an unnatural color shift.

Also, in the second embodiment, as in the first embodiment, the color shift suppression is performed only on the low-frequency component and the color information in high frequencies is retained. As a result, it becomes possible to precisely retain color change information of an object even at the time of high illuminance. In particular, when an image is clipped from a moving picture and is printed, if a high-illuminance part is uniformly converted into achromatic color as in the conventional case, the continuity of color is lost and this converted part becomes visually conspicuous. In the present embodiment, however, the achromatic color processing is performed only for a specific frequency band and therefore the color change information is left in the high-frequency coefficient. As a result, it becomes possible to provide a still image having image quality sufficient for appreciation.

Also, in the present embodiment, LL data necessary for frequency band synthesization at the time of decoding is used for illuminance detection, so that a specifically designed detection filter conventionally required to perform processing on a camera side can be eliminated, which achieves cost reduction.

Now, referring again to FIG. 12, if the result of the comparison in step 3040 is that the average value Yave is not greater than the predetermined value Yh, that is, if it is decided that illuminance is high, a chrominance normal step size is set (step 3050).

The second embodiment of the present invention that controls image processing, in particular, image compression encoding processing at the time of reproduction is described in accordance with illuminance.

In the first and second embodiments described above, the illumination detection is performed using the LL image or data, although the same effect is provided even if an LL image or data at a deeper level (3LL, for instance) generated by recursively performing the frequency band division on the low-frequency data or an LL image or data generated at an intermediate level (2LL, for instance) is used. As a result, this construction is also an embodiment of the present invention.

Also, in the two embodiments described above, the level control of each frequency band is achieved by adapting different quantization steps at the time of encoding and decoding, although even if a circuit for simply multiplying a conversion coefficient by a weight is provided, the same effect is provided. As a result, this construction is also an embodiment of the present invention.

Further, in the two embodiments described above, the present invention is applied to the frequency band division encoding system. However, the present invention is not limited to this and the same effect is provided even if the present invention is applied to an encoding system where frequency conversion is performed at the time of conversion manipulation. In more detail, the present invention is applicable to an encoding system based on a DCT conversion system. This construction is also an embodiment of the present invention.

It is to be understood that the object of the present invention may also be accomplished by supplying a system or an apparatus with a storage medium storing a program code of software that realizes the functions of the above-mentioned embodiments, and causing a computer (or a CPU or an MPU) of the system or the apparatus to read and execute the program code stored in the storage medium.

In this case, the program code itself read from the storage medium realizes the functions of the above-mentioned embodiments, so that the program code itself and the storage medium storing the program code constitute the present invention.

Examples of the storage medium for supplying the program code include a flexible disk, a hard disk, an optical disk, a magnetic-optical disk, a CD-ROM, a CD-R, a magnetic tape, a nonvolatile memory card, a ROM, and the like.

Also, it is to be understood that the functions of the above-mentioned embodiments may be accomplished not only by executing the program code read out by the computer, but also by causing an OS (basic system or operating system) or the like operating on the computer to perform a part or all of actual operations based on instructions of the program code.

Further, it is to be understood that the functions of the above-mentioned embodiments may be accomplished by writing the program code read out from the storage medium into a memory provided on a function expansion board inserted into the computer or a function expansion unit connected to the computer and then causing a CPU or the like provided on the function expansion board or the function expansion unit to perform a part or all of the actual operations based on instructions of the program code.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing apparatus for decoding encoded image data, comprising:
   input means for inputting the encoded image data;
   data processing means for performing predetermined processing on the encoded image data;
   illuminance detection means for detecting illuminance of the encoded image data; and
   changing means for changing the operation of said data processing means on predetermined frequency data of the encoded image data in accordance with an output from said illuminance detection means.

2. An image processing apparatus according to claim 1, wherein said illuminance detection means outputs a first output signal when detecting that the illuminance of the encoded image data is lower than a first illuminance, and wherein, when receiving the first output signal, said changing means changes the processing for high-frequency band data of said data processing means.

3. An image processing apparatus according to claim 2, wherein said data processing means is an inverse quantization means, and wherein, when receiving the first output signal, said changing means performs inverse quantization with a quantization step smaller than that at the time of encoding.

4. An image processing apparatus according to claim 2, wherein said data processing means is a multiplication means, and
wherein when receiving the first output signal, said changing means sets a value smaller than a normal value for multiplication.

5. An image processing apparatus according to claim 1, wherein said illuminance detection means outputs a second output signal when detecting that the illuminance of the encoded image data is lower than a second illuminance, and
wherein when receiving the second output signal, said changing means changes the processing for low-frequency band data of said data processing means.

6. An image processing apparatus according to claim 5, wherein said data processing means is an inverse quantization means, and
wherein, when receiving the second output signal, said changing means performs inverse quantization with a quantization step smaller than that at the time of encoding.

7. An image processing apparatus according to claim 5, wherein said data processing means is a multiplication means, and
wherein, when receiving the second output signal, said changing means sets a value smaller than a normal value for multiplication.

8. An image processing apparatus according to claim 1, wherein said data processing means performs one of decoding of an image data to which frequency band division encoding is performed and decoding of an image data to which wavelet conversion encoding is performed.

9. An image processing apparatus according to claim 1, wherein said data processing means performs one of decoding of an image data to which discrete cosine conversion is performed and decoding of an image data to which corrected discrete cosine conversion is performed.

10. An image processing apparatus according to claim 1, wherein said illuminance detection means detects the illuminance by referring to low-frequency band data among the encoded image data, which is generated as a result of frequency conversion.

* * * * *